United States Patent
Mehrvar et al.

(10) Patent No.: US 11,799,580 B2
(45) Date of Patent: Oct. 24, 2023

(54) HIGH DEGREE OPTICAL CROSS-CONNECT CLOUD CLUSTER NODE ARCHITECTURE

(71) Applicant: HUAWEI TECHNOLOGIES CO., LTD., Shenzhen (CN)

(72) Inventors: Hamid Mehrvar, Ottawa (CA); Hui Xiang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/846,663

(22) Filed: Jun. 22, 2022

(65) Prior Publication Data

US 2022/0329340 A1 Oct. 13, 2022

Related U.S. Application Data

(63) Continuation of application No. PCT/CN2020/116931, filed on Sep. 22, 2020.

(51) Int. Cl.
*H04J 14/02* (2006.01)
*H04Q 11/00* (2006.01)

(52) U.S. Cl.
CPC ........ *H04J 14/021* (2013.01); *H04J 14/0215* (2013.01); *H04Q 11/0005* (2013.01); *H04Q 2011/0007* (2013.01)

(58) Field of Classification Search
None
See application file for complete search history.

(56) References Cited

U.S. PATENT DOCUMENTS

| | | | | |
|---|---|---|---|---|
| 2008/0008474 | A1* | 1/2008 | Boduch | H04J 14/0217 398/68 |
| 2009/0041457 | A1* | 2/2009 | Maki | H04J 14/0204 398/45 |
| 2009/0103453 | A1* | 4/2009 | Hand | H04L 45/00 370/254 |
| 2014/0219658 | A1* | 8/2014 | Xia | H04J 14/06 398/65 |
| 2015/0055945 | A1* | 2/2015 | Wellbrock | H04J 14/021 398/2 |
| 2015/0117851 | A1* | 4/2015 | Wellbrock | H04B 10/032 398/58 |

(Continued)

FOREIGN PATENT DOCUMENTS

CN 108267817 A 7/2018

*Primary Examiner* — David W Lambert

(57) ABSTRACT

Methods and apparatus for a reconfigurable optical add-drop multiplexer (ROADM) cluster node are provided. In some embodiments, the ROADM cluster node includes a set of g line chassis for performing line functionality. In some embodiments, the ROADM cluster node further includes a set of h add-drop chassis for performing add-drop functionality. In some embodiments, each of the g line chassis includes a set of N line cards and a set of M interconnect cards. In some embodiments, the ROADM cluster node further includes a set of M interconnect chassis configured for interconnecting each line chassis to each other line chassis. In some embodiments, the set of M interconnect chassis is further configured for interconnecting each line chassis to each of the h add-drop chassis. In some embodiments, the ROADM cluster node separates the line functionality and add-drop functionality. In some embodiments, $1.15N \leq M \leq 1.5N$.

20 Claims, 14 Drawing Sheets

(56) References Cited

U.S. PATENT DOCUMENTS

2016/0191188 A1* 6/2016 Butler ................ H04Q 11/0005
398/48
2019/0052393 A1* 2/2019 Barnard .............. H04J 14/0293
2019/0281373 A1* 9/2019 Sadasivarao ........ H04L 41/0226

* cited by examiner

US 11,799,580 B2

HIGH DEGREE OPTICAL CROSS-CONNECT CLOUD CLUSTER NODE ARCHITECTURE

CROSS REFERENCE TO RELATED APPLICATION

This application is a continuation of International Application No. PCT/CA2020/116931 filed Sep. 22, 2020 entitled "HIGH DEGREE OPTICAL CROSS-CONNECT CLOUD CLUSTER NODE ARCHITECTURE" the contents of which are incorporated herein by reference.

FIELD OF THE INVENTION

The present invention pertains to the field of network communications, and in particular, to methods and apparatus related to high degree OXC cloud cluster node architecture.

BACKGROUND

Existing fiber optic networks use optical nodes including reconfigurable optical add-drop multiplexer (ROADM) to perform various functions on light beams of various wavelengths. Among other functions, ROADMs add, drop and redirect wavelengths. Existing ROADMs offer limited degrees or directions that may be applied to a wavelength for redirection. Further, existing ROADMs offer limited add-drop rates for adding and/or dropping wavelengths at the ROADMs. As demand for network capacity increases, existing ROADMs may be unable to meet the increased demand. In addition, stakeholders of optical networks including vendors and customers have already invested substantially in existing ROADMs that are not only expensive but also have long life spans.

Therefore, there is a need for a method and apparatus for improving the existing ROADMs functionalities to better meet the increased network demands and obviates or mitigates one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY

An object of embodiments of the present invention is to provide a method and apparatus for a high degree ROADM cluster node.

An aspect of the present disclosure provides for a reconfigurable optical add-drop multiplexer (ROADM) cluster node that separates line functionality and add-drop functionality. The ROADM cluster node includes a set of g line chassis for performing line functionality, wherein each of the g line chassis includes a set of N line cards and a set of M interconnect cards. The ROADM cluster node further includes a set of h add-drop chassis for performing add-drop functionality. The ROADM cluster node further includes a set of M interconnect chassis configured for interconnecting each line chassis to each other line chassis and interconnecting each line chassis to each of the h add-drop chassis. In some embodiments, N<M. In some embodiments, $1.15N \le M \le 1.5N$. In some embodiments, $1.25N<M<1.3N$. In any of the preceding embodiments, each add-drop chassis includes a set of X add-drop cards and a set of P interconnect cards, wherein P=M. In any of the preceding embodiments, each of the M interconnect chassis includes a set of g interconnect cards, wherein each of the g interconnect cards is connected to a different line chassis of the set of line chassis. In any of the preceding embodiments, each of the M interconnect chassis further includes a set of h interconnect cards, wherein each of the h interconnect cards is connected to a different add-drop chassis of the set of add-drop chassis. In any of the preceding embodiments, each line chassis includes T number of slots for housing the set of N line cards and the set of M interconnect cards such that N+M=T. In any of the preceding embodiments, each interconnect chassis includes S interconnect cards such that S=g+h. In any of the preceding embodiments, each of the N line card includes a wavelength select switch. In any of the preceding embodiments, each of the M interconnect card includes a wavelength select switch. In any of the preceding embodiments, each of the X add-drop cards includes a wavelength select switch. In any of the preceding embodiments, each of the g and h interconnect card includes a wavelength select switch. In any of the preceding embodiments, X=N/2.

Another aspect of the present disclosure provides for a chassis for performing one of line functionality and add-drop functionality of a reconfigurable optical add-drop multiplexer (ROADM) cluster node that separates line functionality and add-drop functionality. The chassis includes a set of M interconnect cards, wherein each of the M interconnect cards connects the chassis to each interconnect chassis of a set of M interconnect chassis of the ROADM cluster node. In any of the preceding embodiments, the chassis performs line functionality, the chassis further includes a set of N line cards. In any of the preceding embodiments, the chassis performs add-drop functionality, the chassis further including a set of N/2 add-drop line cards. In any of the preceding embodiments, N<M. In some embodiments, $1.15N \le M \le 1.5N$. In some embodiments, $1.25N<M<1.3N$. In any of the preceding embodiments, the chassis further includes T number of slots for housing the set of N line cards and the set of M interconnect cards such that N+M=T. In any of the preceding embodiments, the chassis further includes T number of slots for housing the set of N/2 add-drop cards and the set of M interconnect cards such that N+M=T.

Another aspect of the disclosure provides for an interconnect chassis for interconnecting each line chassis of a set of line chassis of a reconfigurable optical add-drop multiplexer (ROADM) cluster node to each add-drop chassis of a set of add-drop chassis of the ROADM cluster node. The ROADM cluster node is configured to separate line and add-drop functionality. The set of line chassis is configured to perform line functionality of the ROADM cluster node. The set of add-drop chassis is configured to perform add-drop functionality of the ROADM cluster node. The interconnect chassis includes a first set of interconnect cards, wherein at least one of the first set of interconnect cards is connected to a different line chassis of the set of line chassis. The interconnect chassis further includes a second set of interconnect cards, wherein at least one of the second set of interconnect cards is connected to a different add-drop chassis of the set of add-drop chassis. In some embodiments, each line chassis of the set of line chassis includes a set of N line cards and a set of M interconnect cards, wherein N<M. In some embodiments, $1.15N \le M \le 1.5N$. In some embodiments, $1.25N<M<1.3N$. In any of the preceding embodiments, each line chassis of the set of line chassis comprises T number of slots for housing the set of N line cards and the set of M interconnect cards such that N+M=T.

Embodiments have been described above in conjunctions with aspects of the present invention upon which they can be implemented. Those skilled in the art will appreciate that embodiments may be implemented in conjunction with the aspect with which they are described, but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

BRIEF DESCRIPTION OF THE FIGURES

Further features and advantages of the present invention will become apparent from the following detailed description, taken in combination with the appended drawings, in which.

It will be noted that throughout the appended drawings, like features are identified by like reference numerals.

DETAILED DESCRIPTION

Figure 1:
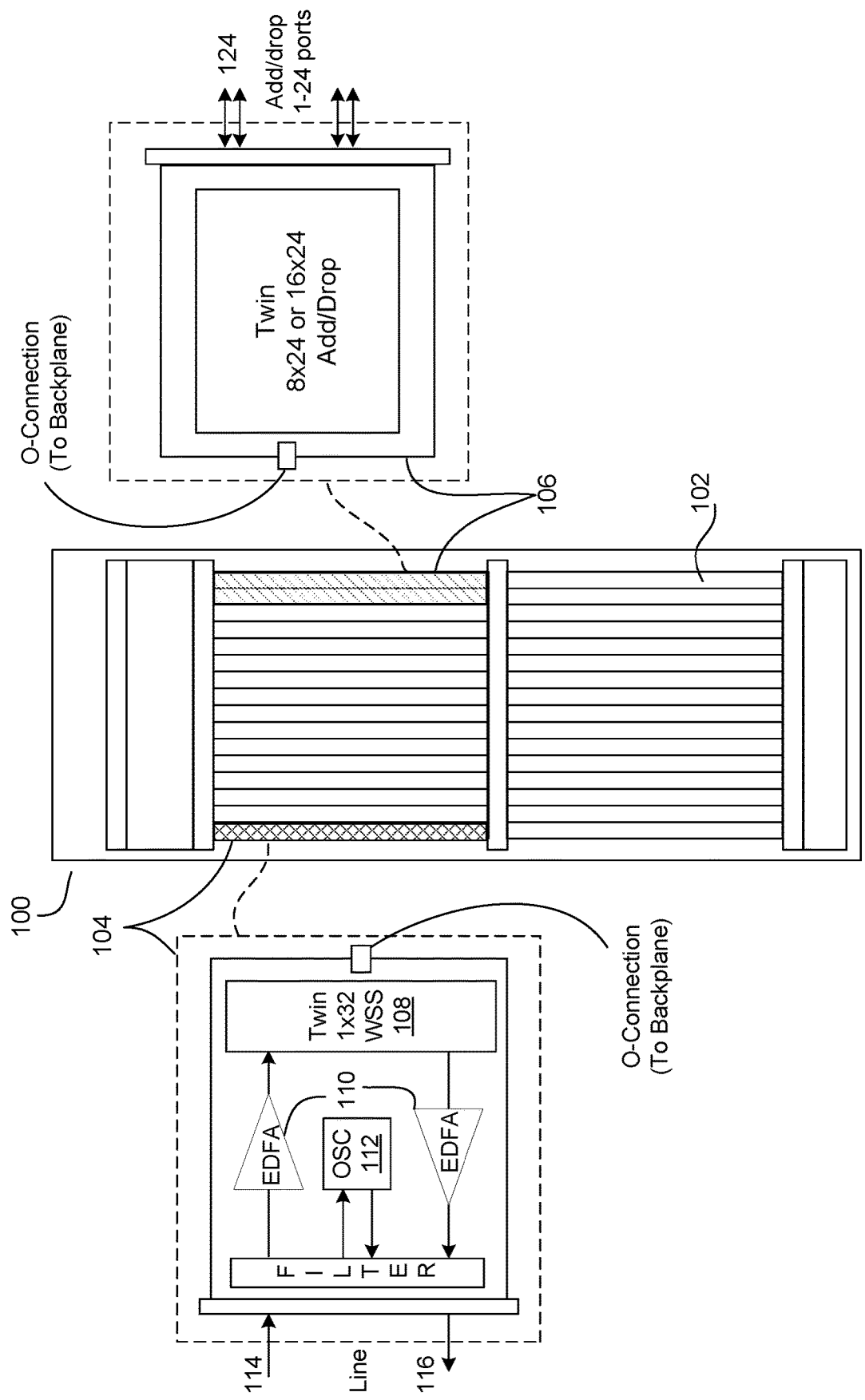
FIG. 1 is an example of an existing chassis for a ROADM node, according to an embodiment of the present invention.

A ROADM is an optical node that adds, blocks, passes or redirects light beams of various wavelengths identified by their colors in a fiber optic network. ROADMs are used in systems that employ wavelength division multiplexing allowing data traffic modulated on a wavelength to be added at a source node and then passed through one or many ROADM nodes before the data traffic is dropped at a destination node. Once dropped, the destination node demodulates the light and decodes the data into electronic bits.

A ROADM plays a key role in switching and transporting of high volume of data. The ROADM is characterized by two parameters: one is the number of directions (or the number of fibers) and the other is the number of wavelengths that can be added or dropped at the ROADM. Each fiber can carry a predetermined number of wavelengths (e.g., 80 wavelengths for International Telecommunication Union (ITU) 50 GHz fixed grid). In the absence of wavelength conversion at the ROADM node, wavelength n of a fiber in direction i is dropped or switched to wavelength n of direction j.

The highest degree (i.e., number of directions) that a ROADM may offer on the market today is 8 or 16. Assuming the number of wavelengths in each direction is 80, the number of wavelengths that can be added or dropped is limited. For instance, the add-drop rate for a ROADM node such as an OSN 9800 is 45% when deployed as an 8 degree ROADM, and 15% when deployed as a 16 degree ROADM. Accordingly, the number of add-drop wavelengths, where each fiber holds 80 wavelengths, for an 8 degree ROADM is about 0.45×8×80=288 wavelengths; and for a 16 degree ROAM, the number of add-drop wavelengths is 0.15 w×16× 80=192 wavelengths.

One of the challenges of the prior art is the limited number of degrees or directions that a ROADM may accommodate. In addition, another limitation of the prior art is the low add/drop rate that current ROADMs provide. As discussed herein, the highest number of degrees a ROADM may have is limited to 8 or 16 degrees. With increased traffic, there is a need for a ROADM with higher number of degrees to permit transmission in many different directions and a corresponding flexibility and increase in the add/drop rate. Further, it should be noted that the ROADMs used in the existing optical networks comprise chassis that are quite expensive and have a long life span of 15 to 20 years. Both vendors and customers of the optical networks have invested substantially in these chassis to build ROADMs throughout the network. Therefore, an improvement in ROADMs that may require additional investment, such as purchasing a new chassis, may be less likely for the vendors and customers to adopt. Accordingly, it is desirable to have a low-cost ROADM solution that is scalable in terms of degrees and provides a flexible and increased add/drop rates. The low cost ROADM solution may employ the existing chassis to leverage the long lives of the chassis while keeping expenses low. Accordingly, as the traffic grows and optical network capacity increases, there is a need for both a higher than 8 or 16 degrees ROADM nodes and flexible add/drop rates to accommodate and respond to the increased traffic and optical network capacity.

Embodiments discussed herein provide for a bundle of solutions that allow for increasing the number of degree of a ROADM to 100s. Embodiments herein further provide for a flexible add-drop rate ranging from 0% to 100%. Embodiments discussed herein utilize existing chassis to provide for an increased degree of ROADMs and flexible add-drop rate. Using existing chassis provide for future scaling while minimizing any loss of investments in the existing chassis.

Using existing chassis further allows continuous selling of the existing chassis to customers as demand grows.

In addition to the low cost and scalable solutions provided herein, embodiments provide for adequate performance in terms of wavelength blocking rate. Embodiments provide for an acceptable blocking rate (better than 1e-3) for connectivity of a wavelength from one direction to the same wavelength of another direction.

Figure 2:
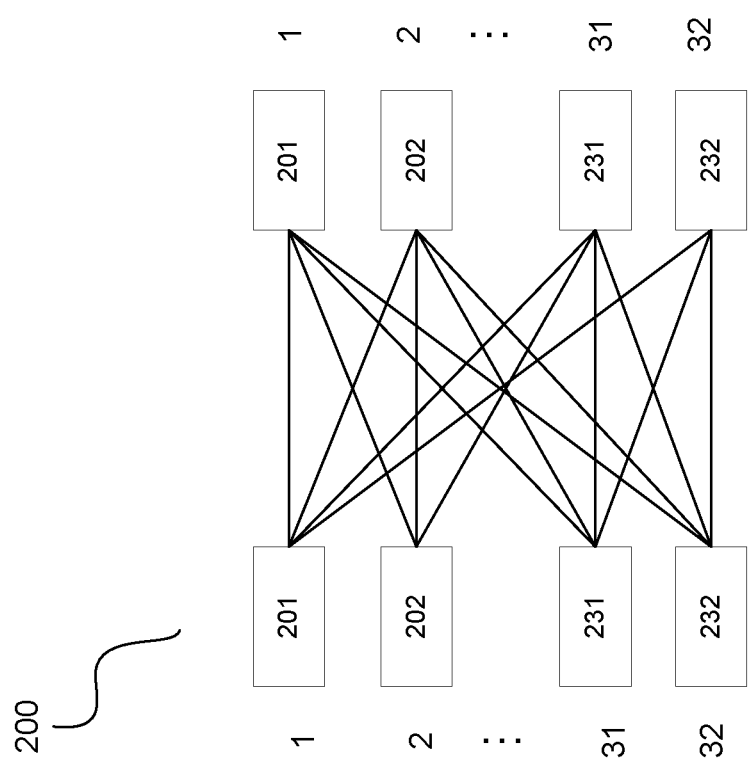
FIG. 2 is an illustration of an optical backplane interconnecting the slots of chassis of FIG. 1, according to an embodiment of the present invention.

FIG. 1 is an example of an existing chassis for a ROADM node, according to an embodiment of the present invention. Referring to FIG. 1, the chassis 100 may comprise 32 slots 102 for holding and/or inserting one or more line cards 104 and one or more add-drop tributary cards 106. Each slot 102 may be fully interconnected to the other 31 slots through an optical backplane 200 (FIG. 2).

The line cards 104 may perform line functionality as it may be interconnected to other ROADM nodes. The add-drop tributary cards 106 process the dropped wavelengths to a node or add a traffic channel on a wavelength of a line card 104.

The total degree of a ROADM node is the total number of fiber pairs connected to the ROADM node. Each fiber pair connects with a line card 104, one fiber on the receiving side 114 and one fiber on the transmitting side 116.

Each line card 104 occupies a single slot 102 of the chassis 100. Each line card 104 (each slot 102) may comprise one fiber pair indicating one direction, both ways. The line card 104 may comprise two 1×32 wavelength select switch (WSS) 108, one on the receiving side 114 and another on the transmitting side 116. The Line card 104 may further comprise two EDFA amplifiers 110 and a circuitry for Optical Service Channel (OSC) 112. On the receiving side, the WSS 108 can extract all 80 wavelengths and place each wavelength at any of its 32 outputs. Provided that each line card is fully interconnected with the other line cards, any one or more wavelength received at each line card may be transmitted to any one or more of the other line cards (directions) through the one or more of the 32 outputs. Since each slot 102 may be fully interconnected to the other 32 slots, the interconnection between the slots 102 allows for full mesh interconnectivity between the line cards 104.

The add-drop tributary card 106 may occupy 2 slots 102. The add-drop card 106 may comprise 24 add-drop ports 124 allowing for up to 24 wavelengths to be added to or dropped at the ROADM. Each line card 104 may be optically interconnected to each of the add-drop cards 106 through the optical backplane 200.

FIG. 2 is an illustration of an optical backplane interconnecting the slots of chassis of FIG. 1, according to an embodiment of the present invention. Referring to FIG. 2, the 32 slots 102 may be represented by slots 201, 202 . . . 231 and 232. Each slot 102 may be interconnected to the other 31 slots through the optical backplane 200. For example, slot 201 is interconnected with the other 31 slots (202 . . . 231 and 232) through the optical connection established by the optical backplane. Accordingly, each line card 104 placed in slots 102 may be interconnected with each of the other line cards and each add-drop cards 104 placed in slots 102. Similarly, each add-drop card places in slots 102 may be interconnected with each of the other add-drop cards and each line cards placed in slots 102.

In some embodiments, the chassis 100 may be used to design an 8 degree ROADM node. For an 8 degree ROADM node, the chassis 100 may comprise 8 line cards 104 occupying 8 slots 102. The remaining 24 slots (32 total slots minus 8 slots used for 8 line cards 104) may be used for 12 add-drop tributary cards 106, each occupying two slots 102. Accordingly, the number of add-drop wavelengths for an 8 degree ROADM node may be 288 (12 add-drop tributary cards×24 wavelength/add-drop tributary card). Therefore, for the case of 96 wavelengths in each direction, the 8 degree ROADM node may have an add-drop rate of 37.5%=(288 wavelengths/(8 line cards×96 wavelengths/line card)). And for the case of 80 wavelengths in each direction, the 8 degree ROADM node may have an add-drop rate of 45%=(288 wavelengths/(8 line cards×80 wavelengths/line card)).

In other embodiments, the chassis 100 may be used to design a 16 degree ROADM node. For a 16 degree ROADM node, the chassis 100 may comprise 16 line cards 104 occupying 16 slots 102. The remaining 16 slots (32 total slots minus 16 slots used for 16 line cards 104) may be used for 8 add-drop tributary cards 106, each occupying two slots 102. Accordingly, the number of add-drop wavelengths for the 16 degree ROADM node may be 192 (8 add-drop tributary cards×24 wavelength/add-drop tributary card). Therefore, for the case of 96 wavelengths in each direction, the 16 degree ROADM node may have an add-drop rate of 12.5%=(192 wavelengths/(16 line cards×96 wavelengths/line card)). And for the case of 80 wavelengths in each direction, the 16 degree ROADM node may have an add-drop rate of 15%=(192 wavelengths/(16 line cards×80 wavelengths/line card)).

An incoming wavelength may be dropped through an add/drop card 106 of a ROADM. The wavelength having arrived at the line card of the ROADM is transferred, through the backplane 200, to the appropriate add/drop card 106 for dropping. The wavelength is then dropped through one of the add/drop ports 124, which may connected to a router.

A wavelength may be also be added to an outgoing wavelength of a ROADM though an add/drop card 106. A router connected to an add/drop port 124 may send data to the add/drop card to be added as a wavelength to an outgoing wavelength of the ROADM. The data may enter the add/drop card 106 through the add/drop port 124 and converted to light and carried on the assigned wavelength. The wavelength may then be transferred through the optical backplane 200 to the appropriate line card 104 to be sent at the assigned wavelength of the appropriate direction (associated with the line card).

Embodiments disclosed herein provide for a ROADM cluster node that allows for a low-cost, scalable and feasible solution for next generation of ROADM nodes. The ROADM cluster node may be built using existing chassis, such as chassis 100. Using existing chassis allows for re-usability and flexibility offering customers the ability to pay for additional capacity as needed. Accordingly, the size can be pay as grow with addition of line and add/drop chassis. The ROADM cluster node may be formulated as follows.

The ROADM cluster node is based on the separation of node functions (line and add-drop functions) that are currently performed in the same chassis, as discussed with respect to FIG. 1. The ROADM cluster node provides for performing the node functions in separate chassis, wherein each chassis performs different functions. The ROADM cluster node may have at least one chassis for line functionalities, in which the chassis may be referred to as a line chassis or a line node. The ROADM cluster node may have at least one chassis for add-drop functionalities, in which the chassis may be referred to as an add-drop chassis or an add-drop node.

The ROADM cluster node may further comprise at least one chassis, which may be referred to as an interconnect or interconnecting chassis, for interconnecting the at least one chassis (line chassis or add/drop chassis) to at least one other chassis (line or add/drop chassis). Accordingly, the interconnect chassis may interconnect line chassis as well as line and add/drop chassis. In some embodiments, there may be more than one line chassis with no add-drop chassis, in which the interconnect chassis interconnects the line chassis. The interconnect chassis may be a separate chassis on its own, separate from the line chassis and the add-drop chassis The ROADM cluster node features a connection manager server that deploys an algorithm that efficiently routes the connections among the ROADM chassis. There may be 3 types of connections: line-to-line, line-to-drop and add-to-line, The algorithm ensure a non-blocking or an acceptable low blocking that is better than 0.001. The execution time of the algorithm is preferably at a minimum. This disclosure focuses on the architecture of the ROADM cluster node and the algorithm is out of its scope.

Figure 3:
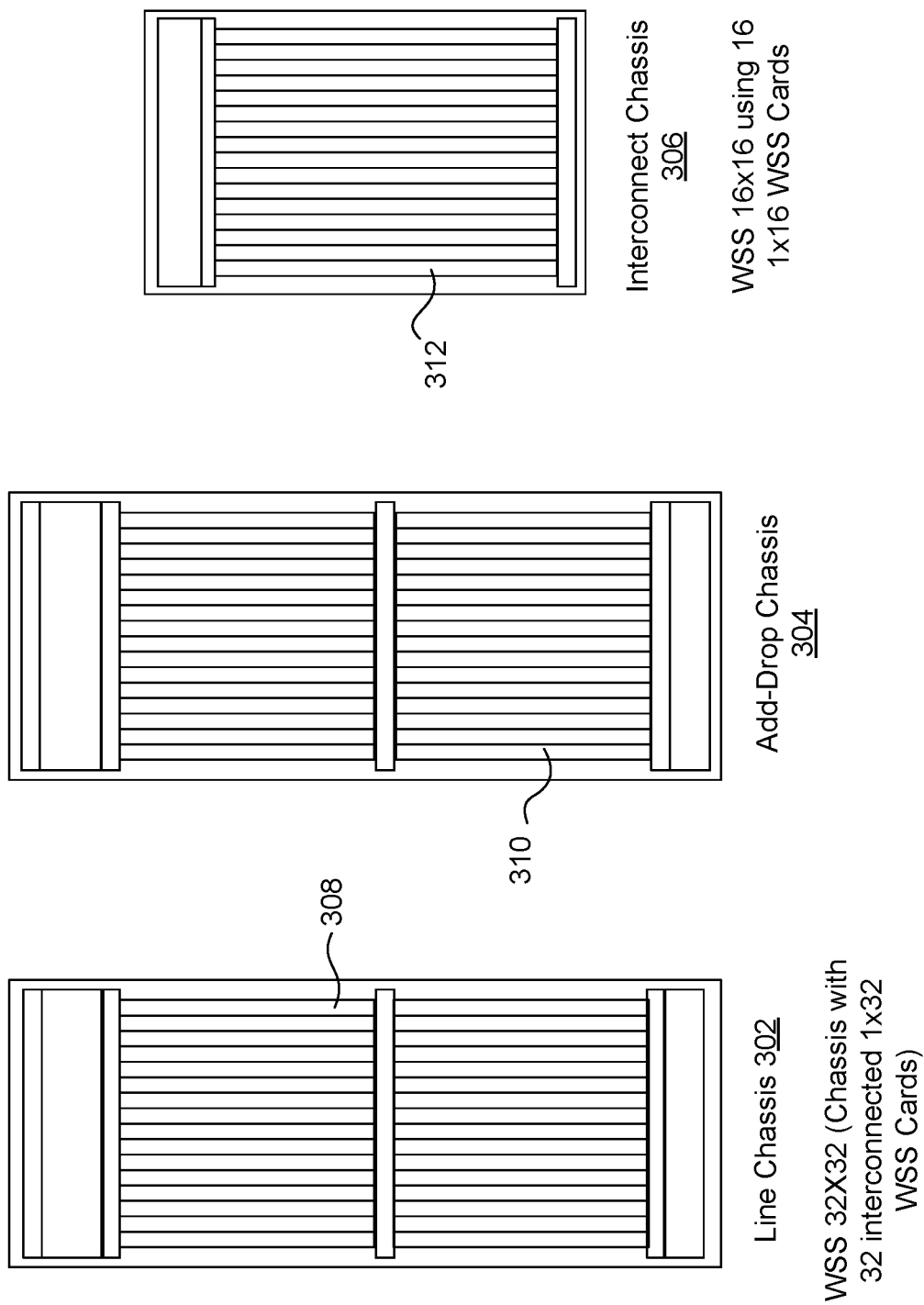
FIG. 3 is an illustration of a line chassis, an add-drop chassis, and an interconnect chassis of a ROADM cluster node, according to an embodiment of the present disclosure.

FIG. 3 is an illustration of a line chassis, an add-drop chassis, and an interconnect chassis of a ROADM cluster node, according to an embodiment of the present disclosure.

Referring to FIG. 3, as discussed herein, the ROADM cluster node may comprise three sets of chassis. A first set of at least one line chassis 302 for performing line functionality (i.e. wherein the at least one line chassis has no add-drop functionality). A second set of at least one add-drop chassis 304 for performing add-drop functionality (i.e. wherein the at least one add-drop chassis has no line functionality). And a third set of at least one interconnect chassis 306. In some embodiments, the at least one line chassis 302 performs line functionality exclusively. Similarly, in some embodiments, the at least one add-drop chassis 304 performs add-drop functionality exclusively.

The line chassis 302 may comprise 32 slots 308 for housing WSS components including N line cards and M interconnect cards. Each line card may be similar to line card 104. Each interconnect card may be a twin 1×32 WSS card. Some of these line cards may be used as line cards to connect with external nodes (i.e., other ROADMS). The rest of the line cards may be used to interface internally with other nodes of the ROADM cluster node. In some embodiments, the line chassis 302 comprising 32 slots may comprise 32 cards. N of the 32 cards may be line cards and M=32-N of the 32 cards may be interconnect cards. Both line cards and inter-connect cards are the same as far as hardware is concerned but their function is different. Line cards are used for INTER-connectivity of the ROADM cluster node to other ROADM nodes whereas inter-connect cards are used for INTRA-connectivity among the chassis within the ROADM cluster node, the INTRA-connectivity referring to the 3 types of connectivity, mentioned above, among line and add/drop chassis of the ROADM cluster node.

The interconnect cards may be used to interconnect the line chassis 302 to each interconnect chassis 306. The line chassis 302 may comprise the same chassis 100 as described herein. The line chassis 302 may further comprise an optical backplane, similar to optical backplane 200, interconnecting the line cards and interconnect cards.

The add-drop chassis 304 may comprise 32 slots 310 for housing WSS components including N/2 add-drop cards and M interconnect cards. It should be noted that the N/2 value is based on the size of existing add-drop cards having double the width of the slots 310. Accordingly, the number of add-drop cards is dependent on the size of the add-drop cards, given that for a chassis comprising 32 slots with M interconnect cards, the add-drop chassis may accommodate 32-M slots for housing the add-drop cards. Accordingly, for add-drops that may only occupy one slot, then the add-drop chassis may comprise 32-M=N add-drop cards.

Each add-drop card may be similar to add-drop card 106 and each interconnect card may be a twin 1×32 WSS card. The add-drop tributary cards are the transponder cards tuned to the wavelengths needed to be added to or dropped at the ROADM cluster node. The interconnect cards may be used to interconnect the add-drop chassis 304 to each interconnect chassis 306. The add-drop chassis 304 may comprise the same chassis 100 described herein. The add-drop chassis 304 may further comprise an optical backplane, similar to optical backplane 200, interconnecting the add-drop cards and interconnect cards.

The inter-connect nodes or chassis, for example interconnect chassis 306, are used for INTRA-connectivity among the components of the cluster nodes, i.e., line and add/drop chassis. The interconnect chassis 306 may comprise S slots for housing WSS components including S interconnect cards. The interconnect chassis 306 may further comprise an optical backplane for interconnecting each interconnect card to the other S−1 interconnect cards. In some embodiments the interconnect chassis may be a chassis similar to one used for line chassis, such as chassis 100, but such a chassis may be an expensive option. In other embodiments the interconnect chassis may use a common equipment low-cost chassis, which may be based on a twin 1×16 WSS, which may be referred to as interconnect card. In such a case, S may be 16, and accordingly, the interconnect chassis may comprise 16 slots, each for one twin 1×16 WSS. Accordingly, the interconnect chassis may comprise 16 of the 1×16 WSS card, and be referred to as 16×16 WSS. The interconnect cards may provide the interconnectivity between the at least one line chassis 302 and the at least one add-drop chassis 304 of the ROADM cluster node. In some embodiments, the S interconnect cards may comprise g interconnect cards, wherein each of the g interconnect cards is connected to one of the g line chassis, and h interconnect cards, wherein each of the h interconnect cards is connected to one of the h add-drop chassis. Accordingly, S=g+h, wherein g is the number of interconnect cards that connects to line chassis and h is the number of interconnects cards that connect to add/drop chassis. In some embodiments there may be g line chassis and h add/drop chassis and one interconnect card may be used for connectivity to each chassis, as illustrated in, for example, FIG. 4. In other embodiments one or more interconnect cards can be used to connect to each of line or add/drop chassis.

Figure 4:
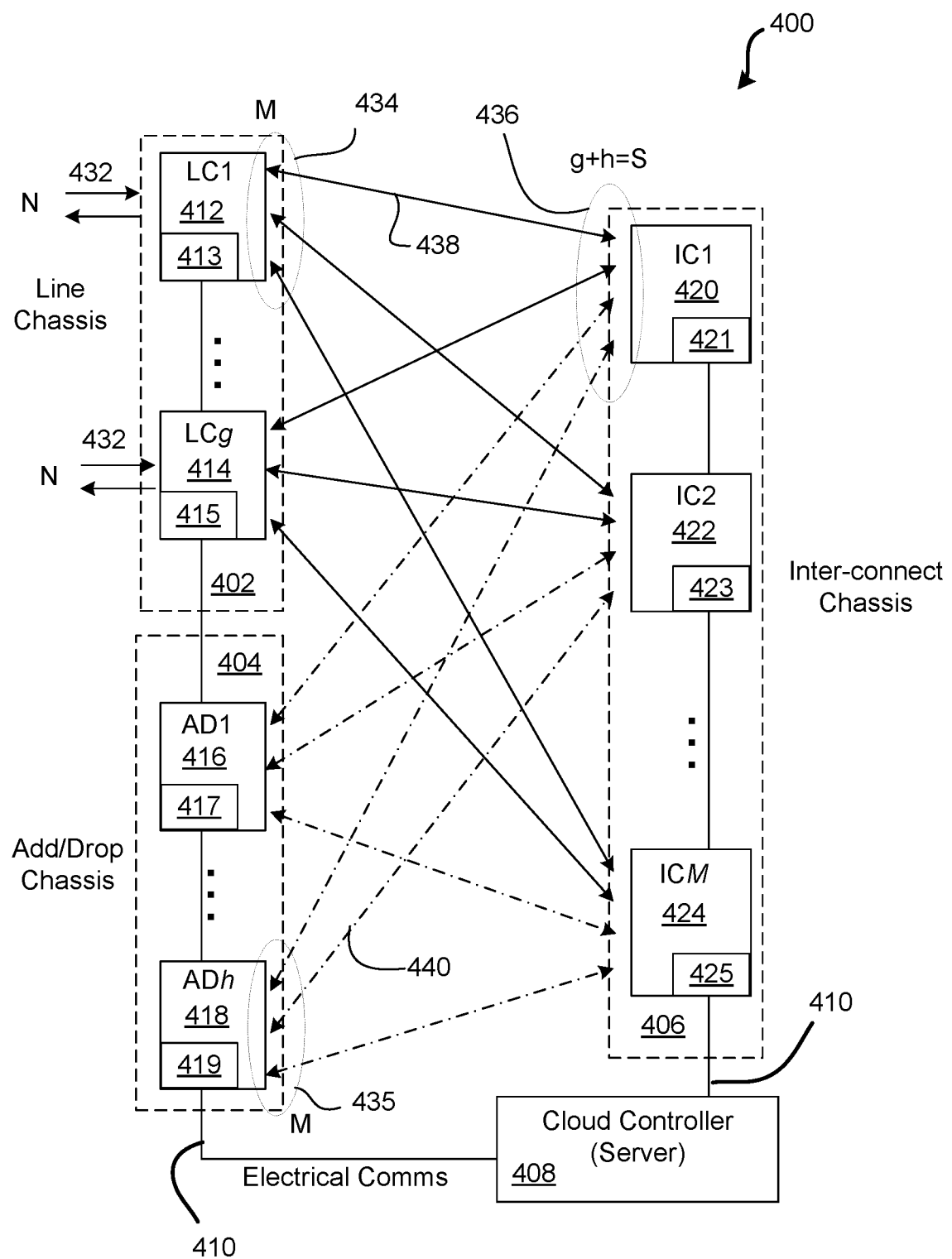
FIG. 4 illustrates a ROADM cluster node configuration comprising M interconnect chassis interconnecting g line chassis and h add-drop chassis, according to an embodiment of the present invention.

FIG. 4 illustrates a ROADM cluster node configuration comprising M interconnect chassis interconnecting g line chassis and h add/drop chassis, according to an embodiment of the present invention.

Referring to FIG. 4, the ROADM cluster node 400 may comprise M interconnect chassis 406, including interconnect chassis 420, 422 and 424. Each of the M interconnect chassis 406 may be an interconnect chassis 306 as described herein. The ROADM cluster node 400 may further comprise g line chassis 402 including line chassis 412 and 414. Each of the g line chassis 402 may be a line chassis 302 as described herein. The ROADM cluster node 400 may further comprise h add-drop chassis 404, including add-drop chassis 416 and 418. Each of the h add-drop chassis 404 may be an add-drop chassis 304 as described herein.

Each of the g line chassis 402 may comprise N line cards 432 for N incoming and outgoing fibers and M interconnect cards 434. Each of the h add-drop chassis 404 may comprise M interconnect cards 435 and N/2 add-drop cards. As discussed elsewhere herein, N/2 value may be different if the size of the add-drop card is changed, for example, if each add-drop card occupy only one slot, then each of the h add-drop chassis 404 may comprise M interconnect cards 435 and N add-drop cards. Each of the M interconnect chassis 406 may comprise S interconnect cards 436 for interconnecting each of the g line chassis 402 and each of the h add-drop chassis 404.

Each of the M interconnect cards 434 of each of the g line chassis 402 may connect via fiber 438, shown as solid line, to each of the M interconnect chassis 406. Similarly, each of the M interconnect cards 435 of each of the h add-drop chassis 404 may connect via fiber 440, shown as dotted line, to each of the M interconnect chassis 406.

The ROADM cluster node architecture provides for two levels of interconnectivity. The first level of interconnectivity may be at intra-chassis or intra-connectivity level, which may be the optical backplane in each line, add-drop, and interconnect chassis as described herein. The second level of interconnectivity may be at the inter-chassis or inter-connectivity level, which may be each of M interconnect chassis 406, interconnecting each of the g line chassis 402 with the each of the h add-drop chassis 404.

The ROADM cluster node 400 may further comprise a cloud controller 408, which may be referred to as a cluster controller, for controlling the operation of the ROADM cluster node 400 as a whole. The cluster/cloud controller 408 may be for cloud ROADM control software. The cluster controller 408 may decide on routing and schedule of connections by maintain stats of all connections of the ROADM cluster node. The cluster controller 408 may also decide on routing and schedule of connection by communicating management messages to all line and add/drop chassis for setting up new connection, for example, from one chassis (line or add/drop) to another chassis (line or add/drop), or to release an existing connection between any two chassis of a cluster.

Each of the g line chassis 402 may have a corresponding chassis controller including line chassis controllers 413 and 415. Each of the h add-drop chassis 404 may have a corresponding chassis controller including add-drop chassis controllers 417 and 419. Each of the M interconnect chassis 406 may have a corresponding chassis controller including interconnect chassis controllers 421, 423 and 425. The cluster controller 408 may be connected 410 and send instructions to each of the g line chassis controllers including chassis controllers 413 and 415, each of the h add-drop chassis controllers including chassis controllers 417 and 419, and each of the M interconnect chassis controllers including chassis controllers 421, 423, and 425. Accordingly the cluster controller and chassis controllers provide for two levels of control, one at the cluster level and one at chassis level. At the chassis level, the chassis controllers may receive instructions from the cluster controller 408 and operate the chassis according to the received instructions.

Accordingly, the ROADM cluster node 400 architecture may be based on the following consideration. M may refer to the number of low-cost common equipment interconnect chassis 306. N may refer to the number of fibers or degrees for each of the g line chassis 402. M plus N equals the total number of WSS components that a line chassis 302 may support. For a given chassis size, e.g., 32 slots, the relationship between M and N is governed by M+N=32. g plus h is total number of interconnect cards that each of the M interconnect chassis 406 may support. In other words g+h=S, wherein, for low cost common equipment interconnect chassis, S may be 16. Accordingly g+h=16. Based on mentioned consideration, the ROADM cluster node 400 may have a total degree of g line chassis multiplied by N, the number of degrees for each line chassis 302. In other word, the total degree of the ROADM cluster node 400 may be g*N. The add-drop of the ROADM cluster node 400 may be determined by the parameter h.

It should be noted that the values selected for parameters M and N may have cost and performance impact. First, the disclosure examines the classical constraint that allows a non-blocking performance, otherwise known as the CLOS architecture. Then, the disclosure will describe a proposed constraint that improves cost and scaling with minimal performance impact.

Given relationships among the parameters as discussed above, embodiments provide for a relationship between M and N. In an embodiment, a 3-stage CLOS relationship is applied to the proposed ROADM cluster node architecture as described herein. The proposed ROADM cluster node architecture, as described herein, is based on separating the functionalities of line cards and the add-drop cards, which are currently combined in one chassis, into separate g line chassis 402 and h add-drop chassis 404, and interconnecting, using M interconnect chassis 406, the separate g line chassis and the h add-drop chassis. The CLOS relationship is as follows: M≥2N−1. Solving for variables M and N, where M+N=32 and M≥2N−1, then M may be equal to 21 and N equal to 11. Accordingly, a ROADM cluster node satisfying the CLOS relationship may have M or 21 common equipment interconnect chassis, and N or 11 degrees or line cards (fiber pairs for incoming and outgoing traffic) in each line chassis. Further, such a ROADM cluster node may provide for g*N degrees. Given the relationship g+h=16, then the range of degrees for the ROADM cluster node of CLOS relationship may be from 88 to 176 degrees. The blocking probability for a CLOS based ROADM cluster node architecture, for any centre stage assignment algorithm, is zero.

TABLE 1

Range of the possible degrees and corresponding add-drop rates of the proposed ROADM cluster node configuration based on different combination of g and h under the CLOS relationship.

| CONFIG CASES N = 11 | Case 1: g = 8; h = 8 | Case 2: g = 10; h = 6 | Case 3: g = 12; h = 4 | Case 4: g = 14; h = 2 | Case 5: g = 16; h = 0 |
|---|---|---|---|---|---|
| Degree | 88 | 110 | 132 | 154 | 176 |
| Add-drop rate | 100% | 60% | 33% | 14% | 0% |

Table 1, refers to the proposed cluster node using CLOS-based rules for relations between N and M. As indicated in the Table 1: where g=8 and h=8, the CLOS based ROADM cluster node provides for 88 degrees with 100% add-drop rate; where g=10 and h=6, the CLOS based ROADM cluster node provides for 110 degrees with 60% add-drop rate; where g=12 and h=4, the CLOS based ROADM cluster node provides for 132 degrees with 33% add-drop rate; where g=14 and h=2, the CLOS based ROADM cluster node provides for 154 degrees with 14% add-drop rate; and where g=16 and h=0, the CLOS based ROADM cluster node provides for 176 degrees with 0% add-drop rate.

In another embodiment, relationships between M and N are proposed such that the ROADM cluster node may provide for a higher degree ROADM cluster node than the CLOS based ROADM cluster node and a significant cost and scaling advantage.

A first proposed relationship between M and N that is based on optimizing the performance and reducing the associated costs may be 1.25N<M<1.3N or simply M<1.3N. The ROADM cluster node based on the second proposed relationship may be referred to as the enhanced ROADM cluster node. Similarly, solving for variables M and N, where M+N=32 and 1.25N<M<1.3N, then M may be equal to 18 and N equal to 14. Accordingly, the enhanced ROADM cluster node satisfying the second proposed relationship may have M or 18 common equipment interconnect chassis, and N or 14 degrees or line cards (fiber pairs for incoming and outgoing traffic) in each line chassis. Further, the enhanced ROADM cluster node may provide for g*N degrees or direction. Given g+h=16, then the range of degrees or directions for the enhanced ROADM cluster node may be from 112 to 224 degrees. The blocking performance of the ROADM cluster node based on the first proposed relationship and use of an algorithm discussed in another disclosure is $10^{\wedge}(-5)$ or 0.00001.

A second proposed relationship between M and N may be as follows: $1.15N \leq M \leq 1.5N$. The second proposed relationship is less optimized than the first proposed relationship for performance and cost, since M<1.15 may offer reduced performance, and M>1.5N may lead to increased costs compared to the first relationship. However embodiments utilizing a range between the first and second relationships can still offer reasonable performance for reasonable cost.

Comparing the enhanced ROADM cluster node with the CLOS based ROADM cluster node, it can be observed the enhanced ROADM cluster node provides for a lower M value than the M value of the CLOS based ROADM cluster node. Lower M value indicates a lower number of comment equipment, e.g. interconnect chassis), and therefore a smaller ROADM cluster node size, offering both scaling and cost benefits. Further, the enhanced ROADM cluster node provides for a high N value than the N value of the CLOS based ROADM cluster node. Higher N value indicates higher number of degrees per line chassis that may be obtained using the enhanced ROADM cluster node over the CLOS based ROADM cluster node, as evident based on Table 2.1 below.

TABLE 2.1

Range of possible degrees and corresponding add-drop rates of the enhanced ROADM cluster node based on different combination of g and h.

| CONFIG CASES N = 14 | Case 1: g = 8; h = 8 | Case 2: g = 10; h = 6 | Case 3: g = 12; h = 4 | Case 4: g = 14; h = 2 | Case 5: g = 16; h = 0 |
|---|---|---|---|---|---|
| Degree | 112 | 140 | 168 | 196 | 224 |
| Add drop rate | 100% | 60% | 33% | 14% | 0% |

As indicated in the Table 2.1: where g=8 and h=8, the enhanced ROADM cluster node provides for 112 degrees with 100% add-drop rate; where g=10 and h=6, the enhanced ROADM cluster node provides for 140 degrees with 60% add-drop rate; where g=12 and h=4, the enhanced ROADM cluster node provides for 168 degrees with 33% add-drop rate; where g=14 and h=2, the enhanced ROADM cluster node provides for 196 degrees with 14% add-drop rate; and where g=16 and h=0, the enhanced ROADM cluster node provides for 224 degrees with 0% add-drop rate.

When comparing Table 2.1 with Table 1, one can observe the advantages of the second proposed relationship 1.25N<M<1.3N or simply M<1.3N (the enhanced ROADM cluster node) over the CLOS relationship M≥2N−1 (the CLOS based ROADM cluster node). The proposed relationships (first and second) provide for an increased number of degrees for the same number of line chassis g and add-drop chassis h and lower number of interconnect chassis M as in the CLOS relationship. In some embodiments, the second proposed relationship provides an increase of approximately 27% in the number of degrees over the CLOS relationship.

In another embodiment, where M+N=16 (referring to 1×16 WSS chassis), the second proposed relationship $1.25N \leq M \leq 1.3N$ may provide for M equal to 9 and N equal to 7. Accordingly, the enhanced ROADM cluster node satisfying the second proposed relationship may have M or 9 common equipment interconnect chassis, and N or 7 degrees or line cards (fiber pairs for incoming and outgoing traffic) in each line chassis. Table 2.2 provides the range of degrees and corresponding add-drop rates of the enhanced ROADM cluster node based on different combination of g and h, where N=7 and M=9.

TABLE 2.2

Range of possible degrees and corresponding add-drop rates of the enhanced ROADM cluster node based on different combination of g and h.

| CONFIG CASES N = 14 | Case 1: g = 8; h = 8 | Case 2: g = 10; h = 6 | Case 3: g = 12; h = 4 | Case 4: g = 14; h = 2 | Case 5: g = 16; h = 0 |
|---|---|---|---|---|---|
| Degree | 56 | 70 | 84 | 98 | 112 |
| Add drop rate | 100% | 60% | 33% | 14% | 0% |

As indicated in the Table 2.2: where g=8 and h=8, the enhanced ROADM cluster node provides for 112 degrees with 100% add-drop rate; where g=10 and h=6, the enhanced ROADM cluster node provides for 70 degrees with 60% add-drop rate; where g=12 and h=4, the enhanced ROADM cluster node provides for 84 degrees with 33% add-drop rate; where g=14 and h=2, the enhanced ROADM cluster node provides for 98 degrees with 14% add-drop rate; and where g=16 and h=0, the enhanced ROADM cluster node provides for 112 degrees with 0% add-drop rate.

Figure 5:
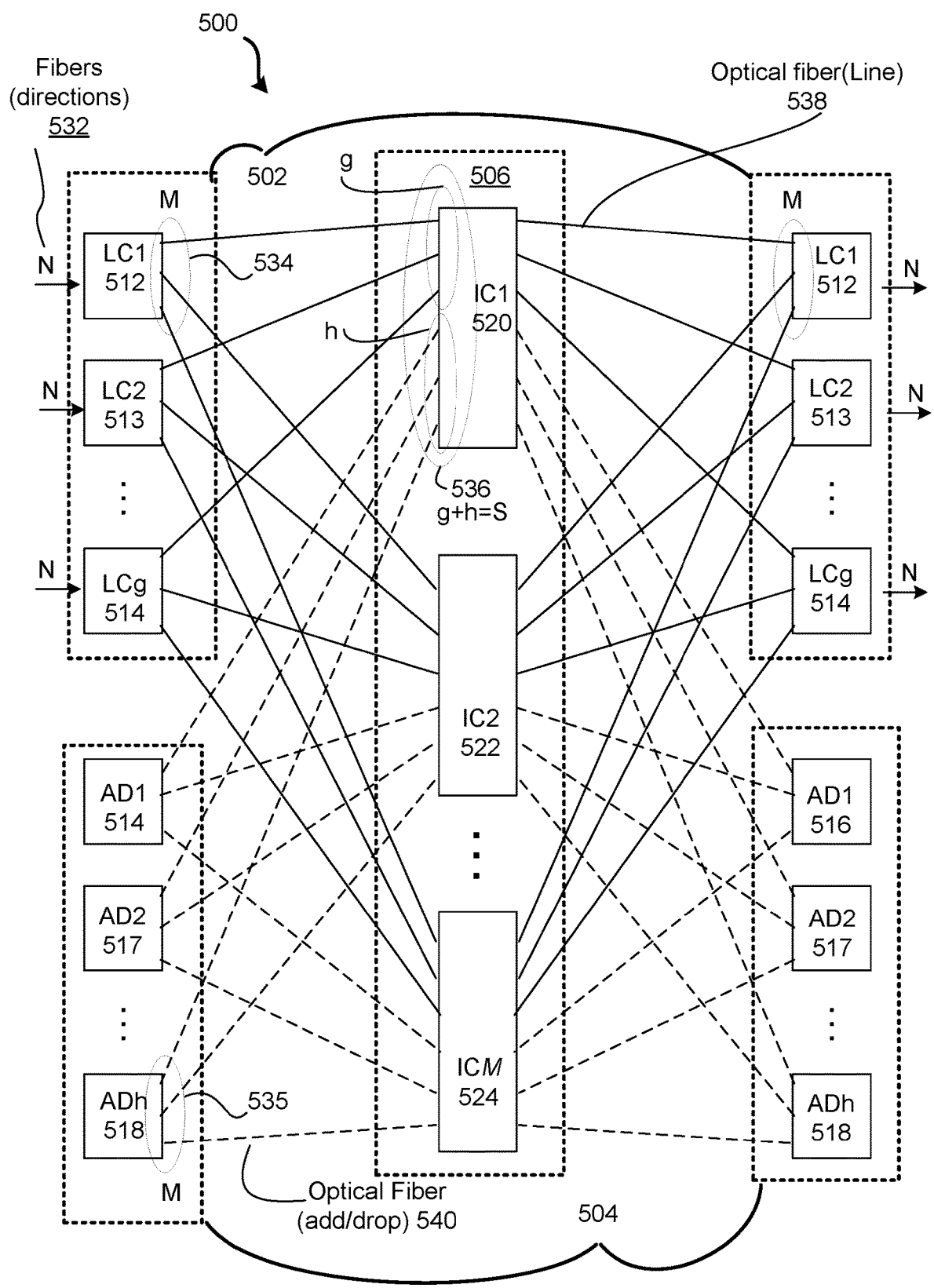
FIG. 5 is another illustration of the ROADM cluster node connectivity architecture, according to an embodiment of the present disclosure.

FIG. 5 is another illustration of the ROADM cluster node connectivity architecture, according to an embodiment of the present disclosure. Referring to FIG. 5, the ROADM cluster node 500 may be similar to ROADM cluster node 400 FIG. 4. The ROADM cluster node 500 may comprise g line chassis 502 (similar to 402) including line chassis 512, 513, and 514. Each of the g line chassis 502 may be a line chassis 302 (with no add-drop functionality) as described herein. The ROADM cluster node 500 may further comprise h add-drop chassis 504 (similar to 404) including add-drop chassis 516, 517, and 518. Each of the h add-drop chassis 504 may be an add-drop chassis 304 as described herein. The ROADM cluster node 500 may further comprise M interconnect chassis 506 (similar to 406) including interconnect chassis 520, 522 and 524. Each of the M interconnect chassis 506 may be an interconnect chassis 306 (with no line functionality) as described herein. Each of the M interconnect chassis 506 interconnects each of the g line chassis 502 and each of the h add-drop chassis 504. The same g line chassis 502 is illustrated, as an unfolded architecture, on two sides of the M interconnect chassis 506 indicating two fiber connections 538, shown as solid line, from each of the g line chassis 502 to each of the M interconnect chassis 506. The two fiber connections indicate one fiber pair, one connection for incoming traffic and one connection for outgoing. Each of the g line chassis may comprise M interconnect cards 534

(similar to 434) for connecting to each of the M interconnect chassis 506. Further, each of the g line chassis 502 may further comprise N line cards 532 (similar to 432), indicating N directions that each of the g line chassis 502 may support.

Similarly, the same h add-drop chassis 504 is illustrated on two sides of the M interconnect chassis 506 indicating two fiber connections 540, shown as dotted line, from each of the h add-drop chassis 504 to each of the M interconnect chassis 506. The two fiber connections indicate one connection for adding traffic and one connection for dropping traffic. Each of the h add-drop chassis may also comprise M interconnect cards 535 (similar to 435) for connecting to each of the M interconnect chassis 506.

Each of the M interconnect chassis 506 may comprise S interconnect cards 536 (similar to 436) for interconnecting each of the g line chassis 502 and each of the g add-drop chassis 504. It should be noted that the CLOS relationship N=2M−1, and the second proposed relationship 1.25N<M<1.3N or simply M<1.3N may be applied to ROADM cluster node 500 as applied similarly to ROADM cluster node 400.

Figure 6:
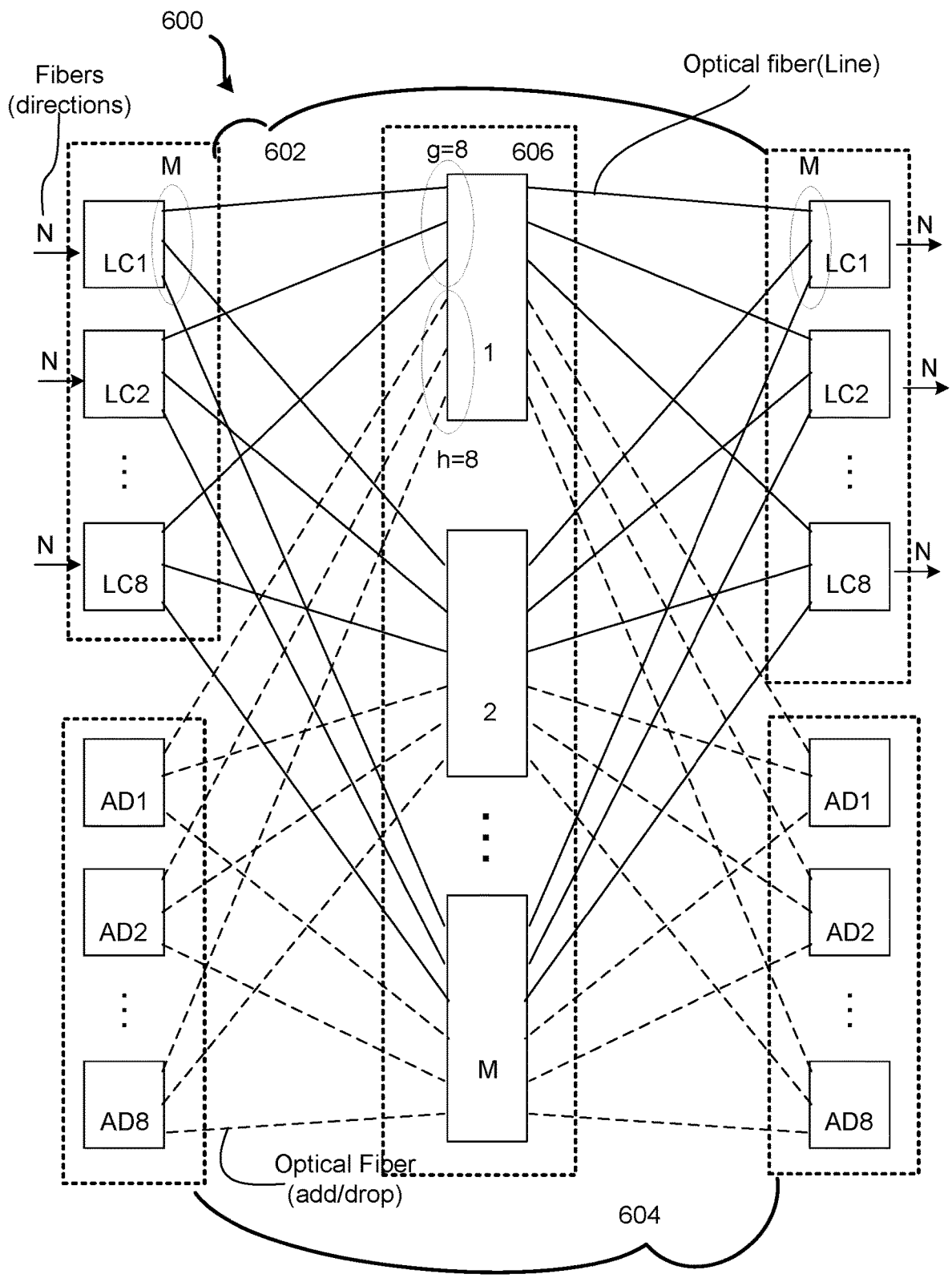
FIG. 6 illustrates a first case of ROADM cluster node of FIG. 5, according to an embodiment of the present invention.

FIG. 6 illustrates a first case of ROADM cluster node of FIG. 5, according to an embodiment of the present invention. The ROADM cluster node 600 is an embodiment of the ROADM cluster node of FIG. 5 wherein both parameters g and h are set to 8. Accordingly, the ROADM cluster node 600 may comprise M interconnect chassis 606, 8 line chassis 602 and 8 add-drop chassis 604. It should be noted that values selected for g and h are based the low-cost common equipment used as the interconnect chassis, wherein the low-cost common equipment comprises 16×16 WSS 306, such that g+h=S=16. Applying the second proposed relationship 1.25N<M<1.3N or simply M<1.3N to the ROADM cluster node 600 wherein M+N=32, N=14 and M=18 yields the following results displayed in Table 3.

TABLE 3

Enhanced ROADM cluster node with 8 line chassis and 8 add-drop chassis, which also reflects the first case of Table 2.1.

| | |
|---|---|
| Number of Line chassis (g) | 8 |
| Number of Add-Drop Chassis (h) | 8 |
| Number of Degree | 112 |
| Add/Drop rate | 100% |
| Total Channels (each degree comprising 80 channels) | 17920 |
| Total Channels Added | 8960 |
| Total Channels Dropped | 8960 |
| Pass-through Channels | 0 |

As table 3 illustrates, at this ROADM cluster node, the total channels, which are the total number of connections: 17920 connections. The total number of connection is based on the total channels added and dropped at this ROADM cluster node. The total number channels dropped is 112*80=8960, and the total channels added (drop-to-line connections) is 8960. Therefore, there are 8960+8960=17920 total number of connections. It should be noted that each connection may be bi-directional, for example, (West-to-drop) and (drop-to-East).

Figure 7:
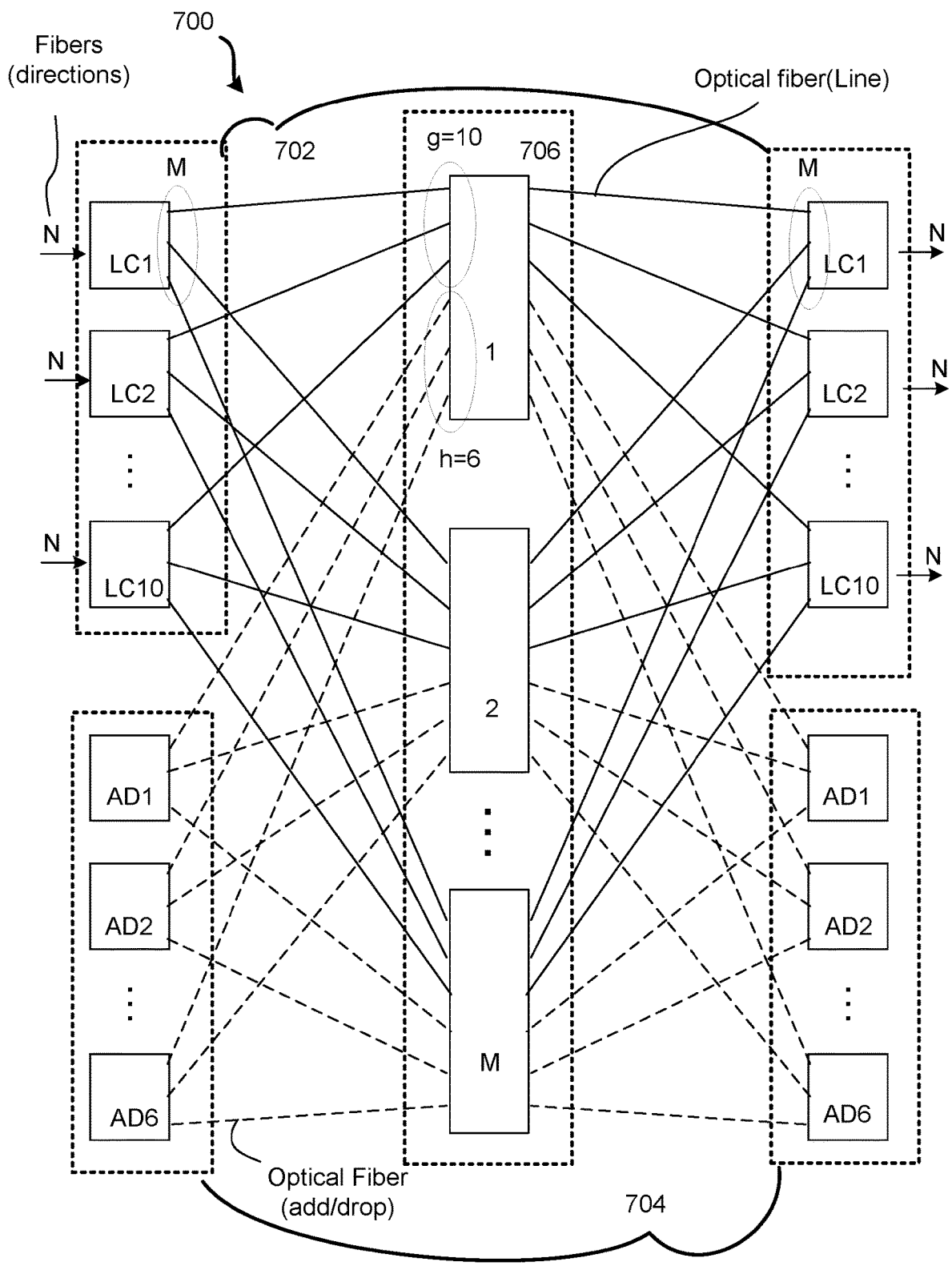
FIG. 7 illustrates a second case of ROADM cluster node of FIG. 5, according to an embodiment of the present invention.

FIG. 7 illustrates a second case of ROADM cluster node of FIG. 5, according to an embodiment of the present invention. The ROADM cluster node 700 is an embodiment of the ROADM cluster node of FIG. 5 wherein parameter g is set to 10 and parameter h is set to 6. Accordingly, the ROADM cluster node 700 may comprise M interconnect chassis 706, 10 line chassis 702 and 6 add-drop chassis 704. Applying the second proposed relationship 1.25N<M<1.3N or simply M<1.3N to the ROADM cluster node 700 wherein M+N=32, N=14 and M=18 yields the following results displayed in Table 4.

TABLE 4

Enhanced ROADM cluster node with 10 line chassis and 6 add-drop chassis, which also reflects the second case of Table 2.1.

| | |
|---|---|
| Number of Line chassis (g) | 10 |
| Number of Add-Drop Chassis (h) | 6 |
| Number of Degree | 140 |
| Add/Drop rate | 60% |
| Total Channels (each degree comprising 80 channels) | 17920 |
| Total Channels Added | 6720 |
| Total channels dropped | 6720 |
| Pass-through Channels | 4480 |

Figure 8:
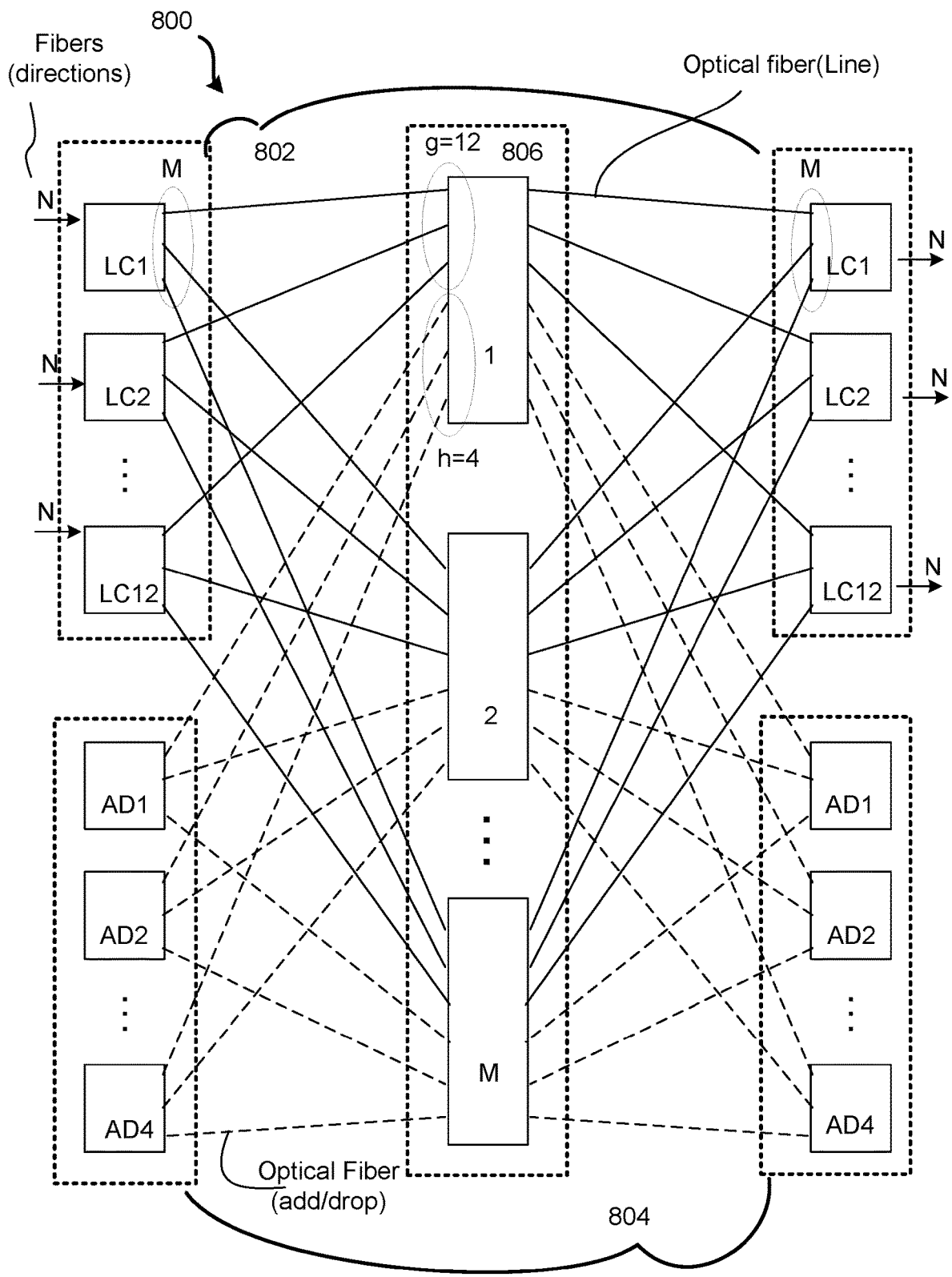
FIG. 8 illustrates a third case of ROADM cluster node of FIG. 5, according to an embodiment of the present invention.

FIG. 8 illustrates a third case of ROADM cluster node of FIG. 5, according to an embodiment of the present invention. The ROADM cluster node 800 is an embodiment of the ROADM cluster node of FIG. 5 wherein parameter g is set to 12 and parameter h is set to 4. Accordingly, the ROADM cluster node 800 may comprise M interconnect chassis 806, 12 line chassis 802 and 4 add-drop chassis 804. Applying the second proposed relationship 1.25N<M<1.3N or simply M<1.3N to the ROADM cluster node 800 wherein M+N=32, N=14 and M=18 yields the following results displayed in Table 5.

TABLE 5

Enhanced ROADM cluster node with 12 line chassis and 4 add-drop chassis, which also reflects the third case of Table 2.1.

| | |
|---|---|
| Number of Line chassis (g) | 12 |
| Number of Add-Drop Chassis (h) | 4 |
| Number of Degree | 168 |
| Add/Drop rate | 33% |
| Total Channels (each degree comprising 80 channels) | 17920 |
| Total Channels Added | 4480 |
| Total Channels Dropped | 4480 |
| Pass-through Channels | 8960 |

Figure 9:
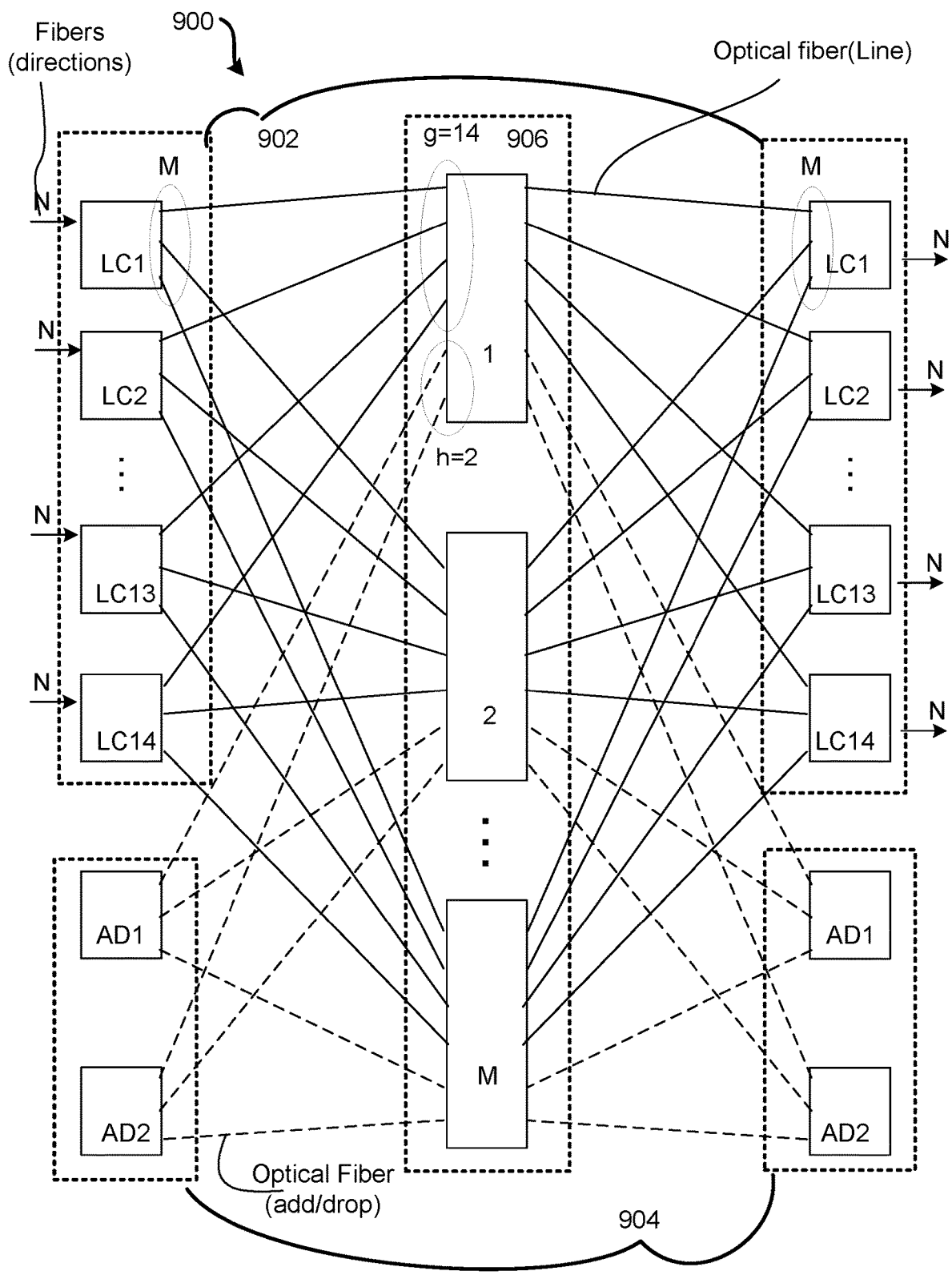
FIG. 9 illustrates a fourth case of ROADM cluster node of FIG. 5, according to an embodiment of the present invention.

FIG. 9 illustrates a fourth case of ROADM cluster node of FIG. 5, according to an embodiment of the present invention. The ROADM cluster node 900 is an embodiment of the ROADM cluster node of FIG. 5 wherein parameter g is set to 14 and parameter h is set to 2. Accordingly, the ROADM cluster node 900 may comprise M interconnect chassis 806, 14 line chassis 902 and 2 add-drop chassis 904. Applying the second proposed relationship 1.25N<M<1.3N or simply M<1.3N to the ROADM cluster node 900 wherein M+N=32, N=14 and M=18 yields the following results displayed in Table 6.

TABLE 6

Enhanced ROADM cluster node with 14 line chassis and 2 add-drop chassis, which also reflects the fourth case of Table 2.1.

| | |
|---|---|
| Number of Line chassis (g) | 14 |
| Number of Add-Drop Chassis (h) | 2 |
| Number of Degree | 196 |
| Add/Drop rate | 14% |
| Total Channels (each degree comprising 80 channels) | 17920 |
| Total Channels Added | 2240 |
| Total Channels Dropped | 2240 |
| Pass-through Channels | 13440 |

Figure 10:
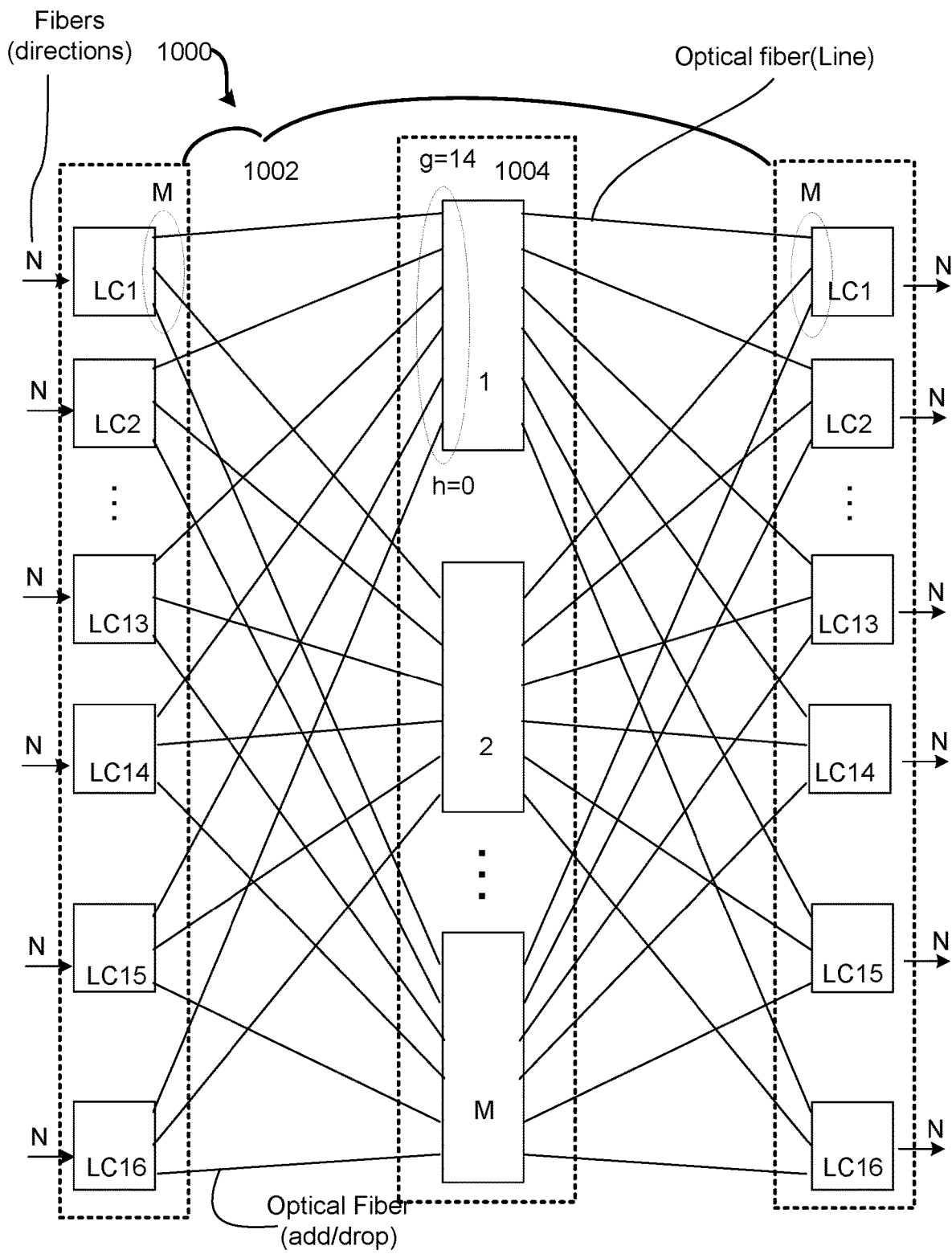
FIG. 10 illustrates a fifth case of ROADM cluster node of FIG. 5, according to an embodiment of the present invention.

FIG. 10 illustrates a fifth case of ROADM cluster node of FIG. 5, according to an embodiment of the present invention. The ROADM cluster node 1000 is an embodiment of the ROADM cluster node of FIG. 5 wherein parameter g is set to 16 and parameter h is set to 0. Accordingly, the ROADM cluster node 1000 may comprise M interconnect chassis 806, 16 line chassis 1002 and 0 add-drop chassis. Applying the second proposed relationship 1.25N<M<1.3N or simply M<1.3N to the ROADM cluster node 900 wherein M+N=32, N=14 and M=18 yields the following results displayed in Table 7.

TABLE 7

Enhanced ROADM cluster node with 14 line chassis and 2 add-drop chassis, which also reflects the fourth case of Table 2.1.

| | |
|---|---|
| Number of Line chassis (g) | 16 |
| Number of Add-Drop Chassis (h) | 0 |
| Number of Degree | 224 |
| Add/Drop rate | 0% |
| Total Channels (each degree comprising 80 channels) | 17920 |
| Total Channels Added/dropped | 0 |
| Pass-through Channels | 17920 |

Table 8 below is a summary of Tables 3 to 7 tabulating features of the proposed ROADM cluster node architecture in multiple deployment scenarios.

TABLE 8

Summary of Tables 3 to 7 illustrating features of the proposed ROADM cluster node architecture in multiple deployment scenarios.

| | Case 1, FIG. 6 | Case 2, FIG. 7 | Case 3, FIG. 8 | Case 4, FIG. 9 | Case 5, FIG. 10 |
|---|---|---|---|---|---|
| Number of Line chassis (g) | 8 | 10 | 12 | 14 | 16 |
| Number of Add-Drop Chassis (h) | 8 | 6 | 4 | 2 | 0 |
| Number of Degree | 112 | 140 | 168 | 196 | 224 |
| Add/Drop rate | 100% | 60% | 33% | 14% | 0% |
| Total Channels (each degree comprising 80 channels) | 17920 | 17920 | 17920 | 17920 | 17920 |
| Total Channels Added | 8960 | 6720 | 4480 | 2240 | 0 |
| Total Channels Dropped | 8960 | 6720 | 4480 | 2240 | 0 |
| Pass-through Channels | 0 | 4480 | 8960 | 13440 | 17920 |

Referring to Table 8, Case 1 features a ROADM cluster node with 112 degree (112 fibers in and 112 fiber out with 80 wavelengths per fiber) in which all wavelength connections are dropped (terminated) at this node and new connections are sourced from this node. Case 5, on the other hand has no connection terminated nor added as all wavelengths are switched to other fibers in other directions. Both Case 1 and Case 5 may not be deployed, however, they offer corner cases for performance analysis.

It should be noted that, although, in the Table 8, even numbers are used for different combination of g and h, it should be noted that g and h may be also odd numbers, so long as satisfying the relationship g+h=S, wherein S for the low cost common equipment is 16.

As discussed herein, the proposed ROADM cluster node 400, 500 features a collection of many nodes (line chassis, add-drop chassis, and interconnect chassis) and a cluster controller 408 that instruct each of the node controllers so that a connection between an input and an output of the cluster node a can be established.

Embodiments provide for an optical cluster node architecture comprising of many function nodes interconnected to each other through an array of interconnect nodes. The functions of the optical cluster node may be distributed among the nodes (as opposed to all functions being in the same node). The functions may be performed by one or many nodes. Further the interconnectivity bandwidth between the function nodes and interconnect nodes may be no more than 30% dilation.

An example of an optical cluster node is a ROADM cluster node 400, 500 (or wavelength crossconnect cluster node) as described herein. The functions of line, add and drop may be distributed in the nodes of the ROADM cluster node. Each node may be a wavelength cross-connect built from WSS. The line nodes and the add-drop nodes, though separate, may be interconnected by low cost (WXC) wavelength cross-connect nodes. The bandwidth for connectivity of a line or add/drop node to the WXC nodes (and vice versa) is no more than 1.3 times of nodal bandwidth (i.e. no more than 30% dilation). The connection blocking of the ROADM cluster node may be zero or acceptably very low as there will be no re-arrangement of existing connections to accommodate a new connection between two function node through the interconnect node. It should be noted that function notes comprise line nodes, add-drop nodes and/or interconnect nodes.

While the concept of ROADM cluster node, as described herein, is first of its kind, its differences over various optical node architectures including 3-stage optical switch and existing ROADM node may be described.

Table 9 below illustrates features of the proposed ROADM cluster node, for example cluster node 400 or 500. It should be noted that the interconnectivity of the ROADM functions in the proposed cluster node is performed by a WSS optical switch.

TABLE 9

Features of the proposed ROADM Cluster node.

| | Proposed ROADM Cluster node |
|---|---|
| Include Add/Drop | Yes |
| Add/Drop/Line in same Chassis | No, Distributed |
| A/D rate/scaling | No limit |
| Interconnect Component | WSS |
| Interconnect Connectivity | 3-stage Asymmetric (WSS-WSS)-(WSS-WSS)-(WSS-WSS) |
| Component Size | N × M WSS- S * S WSS M × N WSS M/N <1.3 S: Arbitrary |

TABLE 9-continued

Features of the proposed ROADM Cluster node.

|  | Proposed ROADM Cluster node |
| --- | --- |
| Blocking | <10^(−5) |
| Control | No re-arrangement<br>2 levels |

It should be noted that in optical networks, re-arranging existing connections are not typically permitted as the re-arrangement may be affect the service. Accordingly, a non-blocking ROADM with no re-arrangement is a preferred approach.

Referring to Table 9, the cluster node 400 or 500 architecture provides for separated or distributed functionalities of line cards and add-drop cards with zero or minimal blocking. The cluster node offers scalability by altering the values selected for parameters g and h as discussed herein.

The cluster node 400 or 500 provides for a multi-stage (three-stage) WSS interconnect connectivity. The three stages may be a receiving stage, an intermediate or interconnecting stage, and an exit stage. At the receiving stage, light may enter the cluster node at the receiving chassis. At the intermediate or interconnecting stage, which connects the receiving chassis to the exit chassis, light is passed from the receiving chassis, through an interconnect chassis, to the exit chassis. At the exit chassis, light exits the cluster node. The receiving chassis and the exit chassis are connected to the interconnect chassis through fibers. At each stage, light passes through two WSS components and one optical backplane connecting the two WSS components. Accordingly, light passing through the cluster node may pass through six WSS components and three optical backplanes. Between the receiving chassis and the interconnect chassis, light passes through the fiber connecting the two chassis. Similarly, between the interconnect chassis and the exit chassis, light passes through the fiber connect the two chassis.

Light may enter the cluster node through a receiving WSS component of a receiving chassis. The receiving WSS component may be a line card or a the add part of an add-drop card. Provided that the line card and add-drop card functionalities are separate in the cluster node, i.e. in separate chassis, then, where the receiving WSS component is a line card, the receiving chassis is a line chassis 302. Similarly, where the receiving WSS component is the add part of an add-drop card, the receiving chassis is an add-drop chassis 304.

Light, having entered the cluster node, may leave the cluster node through an exit WSS component of the exit chassis. Provided that the line card and add-drop card functionalities are separate in the cluster node, i.e. in separate chassis, then, where the exit WSS component is a line card, the exit chassis is a line chassis 302. Similarly, where the exit WSS component is the drop part of an add-drop card, the exit chassis is an add-drop chassis 304. Between the receiving WSS component and the exit WSS component, the light may passes through four WSS components, which may be four interconnect cards.

The first interconnect card may be the second WSS component of the receiving chassis (the first WSS component being the receiving WSS component). The receiving WSS component and the first interconnect card (the second WSS component) of the receiving chassis are interconnected through an optical backplane. The second and third interconnect cards may be the first and second WSS components of an interconnect chassis 306 connecting the receiving chassis with the exit chassis. The second and third interconnect cards of the interconnect chassis 306 are interconnected though an optical backplane of the interconnect chassis. The fourth interconnect card may be the first WSS component of the exit chassis, the second WSS component of the exit chassis being the exit WSS component. The fourth interconnect card (the first WSS component) and the exit WSS component of the exit chassis are interconnected through an optical backplane of the exist chassis.

The receiving WSS component may be a line card of a line chassis 302 where light is dropped or redirected (its direction changed) at the exit WSS component of the cluster node. Where the light is dropped, the exit WSS component may be an add-drop card of an add-drop chassis 304. Where light is redirected, the exit WSS component may be another line card of another line chassis or the same line chassis.

The receiving WSS component may be an add-drop card of an add-drop chassis when light is added at the cluster node. In such a circumstance, the exit WSS component may be a line card of a line chassis, to which the light is added.

Referring to table 9, the cluster node 400, 500 may provide component sizes as follows: the at least one line chassis may have be an N×M WSS; the at least one interconnect chassis may be an S×S WSS, where S is arbitrary (i.e. S may be 16, referring to the low-cost common equipment 16×16 WSS); and the at least one add-drop chassis may be an M×N WSS. As discussed herein, the cluster node provides for a three-stage WSS interconnect connectivity, wherein the architecture provides for an asymmetric first and the last stage WSS (first stage N*M, last stage M*N) where N<M≤1.3*N, as described herein.

Further, the proposed cluster node provides for a reasonably low or acceptable blocking of less than 10^(−5) with no re-arrangement of existing connections to accommodate a new connection between two function nodes. Also, the proposed cluster node may be allow for two levels of controls, a cluster controller at the cluster level and a chassis controller at the chassis level as discussed herein.

Figure 11:
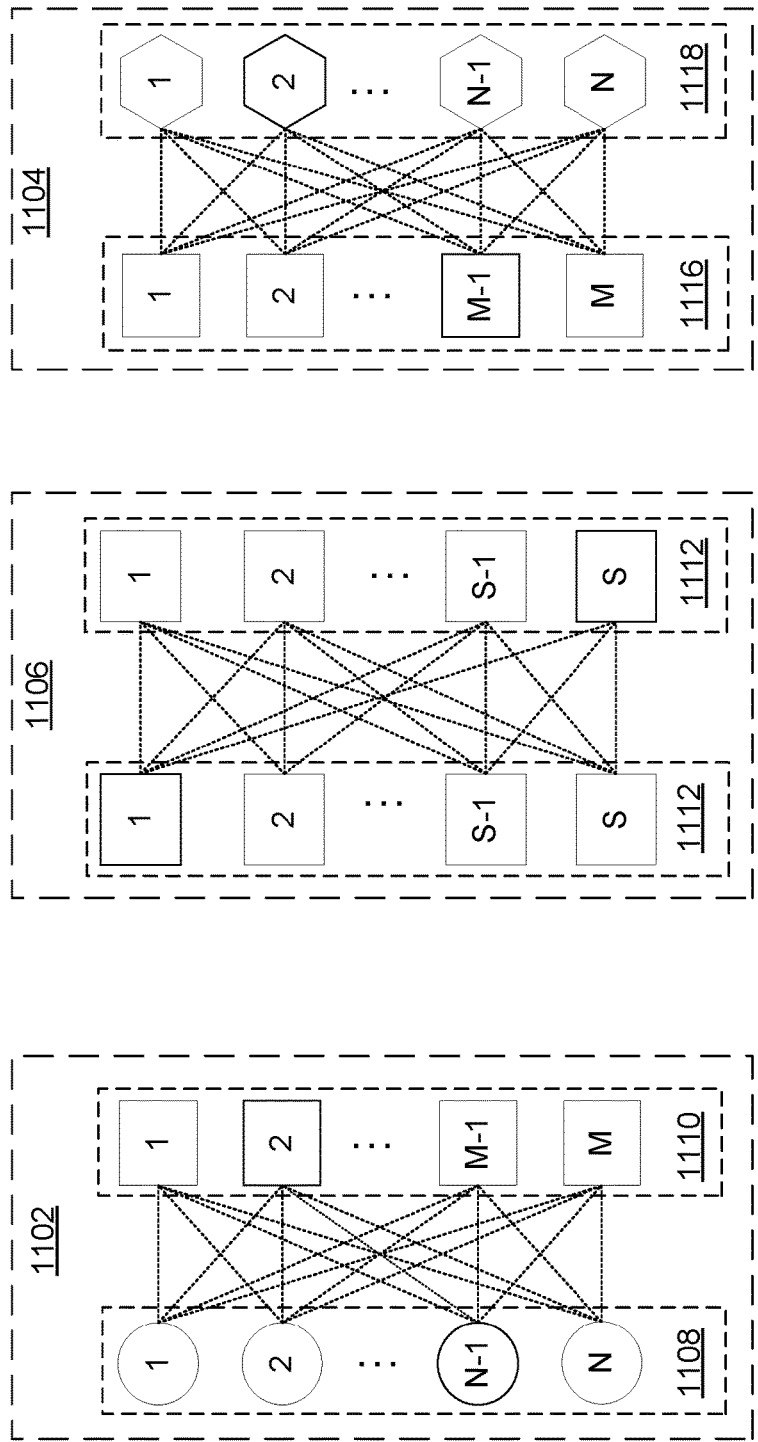
FIG. 11 is an illustration of the three-stage asymmetric WSS interconnect connectivity of the ROADM cluster node, according to an embodiment of the present invention.

FIG. 11 is an illustration of the three-stage asymmetric WSS interconnect connectivity of the ROADM cluster node, according to an embodiment of the present invention. Referring to FIG. 11, each line chassis 1102 of the g line chassis of the cluster node 400 or 500 may comprise N line cards 1108 and M interconnects cards 1110. Each of the N line cards 1108 may be optically interconnected with each of the M interconnect cards 1110 through an optical backplane as illustrated (N×M WSS). Although not shown, it should be noted that the each of the N line cards 1108 may be interconnected with other N−1 line cards, which may be used for intra-chassis connections). Similarly, each of the M interconnect cards 1110 may be interconnected with other M−1 interconnect cards (not shown).

Each interconnect chassis 1106 of the M interconnect chassis of the cluster node 400 or 500 may comprise S interconnect cards 1112. Each of the S interconnect cards 1112 may be optically interconnected with each of the S−1 interconnect cards through an optical backplane as illustrated. For low cost common equipment, S may be 16, referring to 16×16 WSS as discussed herein (S×S WSS).

Further, each add-drop chassis 1104 of the h add-drop chassis of the cluster node 400 or 500 may comprise M interconnect cards 1116 and N add-drop cards 1110. Each of the N add-drop cards 1118 may be optically interconnected with each of the M interconnect cards 1116 through an optical backplane as illustrated (M×N WSS). Although not shown, it should be noted that the each of the N add-drop cards 1118 may be interconnected with other N−1 add-drop cards, and, similarly, each of the M interconnect cards 1116 may be interconnected with other M−1 interconnect cards.

Figure 12:
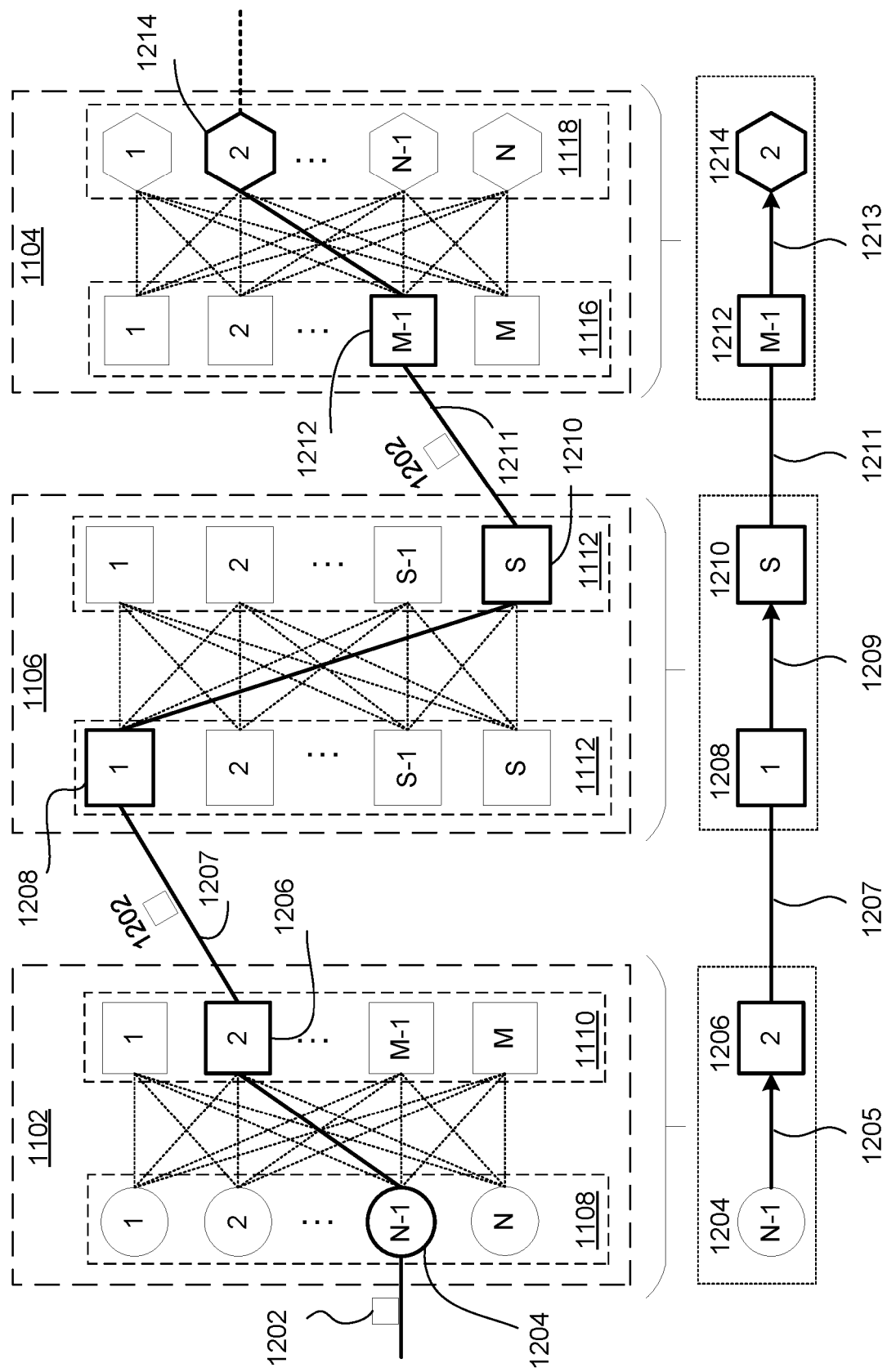
FIG. 12 is an illustration of dropping a wavelength at the ROADM cluster node, accordingly to an embodiment of the present invention.
Figure 13:
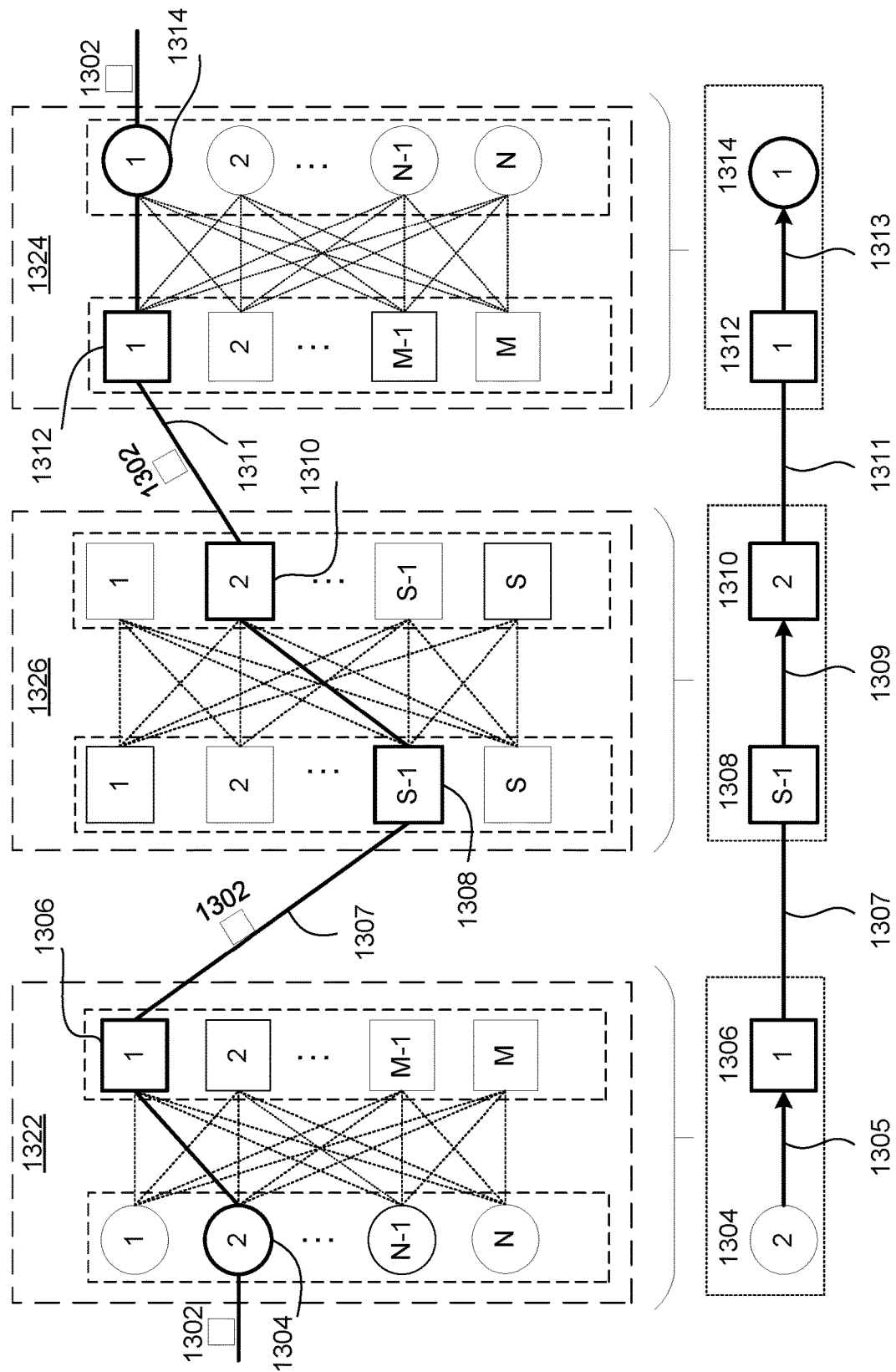
FIG. 13 is an illustration of redirecting or switching a wavelength at the ROADM cluster node, accordingly to an embodiment of the present invention.

It should be noted that line cards in FIGS. 11, 12 and 13 may be represented by a circle, for example N line cards 1108, interconnect or connectivity cards may be represented by a square for example, M interconnect cards 1110, 1116 and S interconnect cards 1112, and add-drop cards may be represented by a hexagon, for example N add-drop cards 1118. The proposed relationship between N and M may be N<M≤1.3N based on the second proposed relationship discussed herein. Where N+N=32, N may be 14 and M may be 18. Further, for a low cost common equipment, parameter S may be 16, such that g+h=S, as discussed herein.

FIG. 12 is an illustration of dropping a wavelength at the ROADM cluster node, accordingly to an embodiment of the present invention. The wavelength 1202 may arrive at cluster node 400 or 500 at receiving WSS component, which may be the line card 1204 for direction N−1, of the receiving chassis, which may be a line chassis 1102.

The cluster controller 408 may determine that the wavelength 1202 is to be dropped at the exit WSS component, which may be the add-drop card 1214 of the add-drop chassis 1104. Accordingly, the cluster controller may send instructions to the chassis controller of the receiving chassis, being the line chassis 1102, for establishing or setting up wavelength connection for the wavelength 1202 to the appropriate interconnect chassis 1106 and exit chassis 1104. The chassis controller of the line chassis 1102 may then establish the wavelength connection according to the received instructions. The chassis controller of the line chassis 1102 may establish, through its optical backplane 1205, the wavelength connection from line card N−1 1204 to the appropriate interconnect card 1206 for establish the connection to the interconnect chassis 1106. The wavelength path of wavelength 1202 is accordingly established through the established wavelength connection to the interconnect chassis 1106 though optical fiber interconnect 1207 connecting the line chassis 1102 to the interconnect chassis 1106.

The cluster controller 408 may send instructions to the chassis controller of the intermediate chassis, being the interconnect chassis 1106, for establishing the wavelength connection for dropping the wavelength 1202 to the appropriate add-drop chassis 1104. The interconnect chassis 1106 may receive, at its interconnect card 1208, the wavelength 1202 from interconnect card 1206 of the line chassis 1102. The chassis controller of the interconnect chassis 1106 may then establish the wavelength connection according to the received instructions. The chassis controller of the interconnect chassis 1106 may establish, through its optical backplane 1209, the wavelength connection from interconnect card 1208 to the interconnect card 1210 for establishing the wavelength connection to the add-drop chassis 1104. The wavelength path of wavelength 1202 is accordingly established through the established wavelength connection to the optical fiber interconnect 1211 for connection to the add-drop chassis 1104.

The cluster controller 408 may send instructions to the chassis controller of the exit chassis, being the add-drop chassis 1104 for dropping the wavelength 1202 at the exist WSS component. The add-drop chassis 1104 may receive, at its interconnect card 1212, the wavelength 1202 from interconnect card 1210 of the interconnect chassis 1106. The chassis controller of the add-drop chassis 1104 may then establish the wavelength connection according to the received instructions. The chassis controller of the add-drop chassis 1104 may establish, through its optical backplane 1213, the wavelength connection for wavelength 1202 received at interconnect card 1212 to the add-drop card 1214.

Accordingly, the flow of a wavelength and its established wavelength connection, for example wavelength 1202, entering and being dropped at the ROADM cluster node 400 or 500 may be as follows: line chassis 1102 (through line card 1204 and interconnect card 1206), interconnect chassis 1106 (through interconnect card 1208 to interconnect card 1210), and add-drop chassis 1104 (through interconnect card 1212 and add-drop card 1214).

Conversely, wavelength connectivity for adding a wavelength at the ROADM cluster node 400 or 500, may be the reverse of the wavelength connectivity for dropping the wavelength at the ROADM cluster node, as described herein with respect to FIG. 12. Accordingly, for adding a wavelength received at the add part of the add-drop card 1214 of the add-drop chassis 1104, to the direction N−1 as supported by line card 1204 of the line chassis 1102 of the ROADM cluster node 400 or 500, the wavelength flow may be as follows: add-drop chassis 1104 (through add-drop card 1214 and interconnect card 1212), interconnect chassis 1106 (through interconnect card 1210 and 1208), and line chassis 1102 (through interconnect card 1206 and line card 1204.

FIG. 13 is an illustration of redirecting or switching a wavelength at the ROADM cluster node, accordingly to an embodiment of the present invention. Line chassis 1322 and 1324 may each be one of the g line chassis of the cluster node 400 or 500, as described herein. The interconnect chassis 1326 may be one of the M interconnect chassis of the cluster node 400 or 500 as described herein. The wavelength 1302 may arrive from direction 2 at receiving WSS component, line card 1304 of the receiving chassis, which may be a line chassis 1322.

The cluster controller 408 may determine that the wavelength 1302 is to be redirected or switched to direction 1 supported by line card 1314 of the line chassis 1324. Accordingly, the cluster controller 408 may send instructions to the chassis controller of the receiving chassis, being the line chassis 1322, for establishing the wavelength connection for wavelength 1302 to the appropriate interconnect chassis 1326 and exit chassis 1324. The chassis controller of the line chassis 13222 may then establish the wavelength connection according to the received instructions. The chassis controller of the line chassis 13222 may establish, through its optical backplane 1305, the wavelength connection between the line card 1304 to the interconnect card 1306, for connection to the appropriate interconnect chassis 1326. The wavelength connection of wavelength 1302 is accordingly established to the interconnect chassis 1326 though optical fiber interconnect 1307 connecting the line chassis 1322 to the interconnect chassis 1326.

The cluster controller 408 may send instructions to the chassis controller of the intermediate chassis, being the interconnect chassis 1326, for establishing the wavelength connection for the wavelength 1302 to the appropriate exit chassis, being line chassis 1324, for redirection. The interconnect chassis 1326 may receive, at its interconnect card 1308, the wavelength 1302 from interconnect card 1306 of the line chassis 1322. The chassis controller of the interconnect chassis 1326 may then establish the wavelength connection according to the received instructions. The chassis controller of the interconnect chassis 1326 may establish, through its optical backplane 1309, the wavelength connection between the interconnect card 1308 and the interconnect card 1310 for connection to the line chassis 1324. The wavelength connection for wavelength 1302 is accordingly established through the optical fiber interconnect 1311, to the line chassis 1324.

The cluster controller 408 may send instructions to the chassis controller of the exit chassis, being the line chassis 1324 for establishing the wavelength connection of the wavelength 1302 to the exit WSS component 1314. The line chassis 1324 may receive, at its interconnect card 1312, the wavelength 1302 from interconnect card 1310 of the interconnect chassis 1326. The chassis controller of the line chassis 1324 may then establish the wavelength connection according to the received instructions. The chassis controller of the line chassis 1324 may establish, through its optical backplane 1313, the wavelength connection between the interconnect card 1312 to the line card 1314. The wavelength 1302 may, accordingly, exit the ROADM cluster node 400 or 500 at line card 1314 of the line chassis 1324 at direction 1.

Accordingly, the flow of the wavelength 1302 and/or the wavelength connection for changing its direction from direction 2 to direction 1 at the ROADM cluster node 400 or 500 may be as follows: line chassis 1322 (through line card 1304 and interconnect card 1306), interconnect chassis 1326 (through interconnect card 1308 to interconnect card 1310), and line chassis 1324 (through interconnect card 1312 and line card 1314).

Embodiments discussed herein provide for an architecture of a ROADM cluster node that allows scaling using existing ROADM nodes, which maximizes return on the investment for both vendors and customers. In some embodiments, the proposed architecture separates ROADM functions, for example line functions and add-drop functions, in separate nodes that are interconnected by inter-connect nodes, as discussed herein.

The proposed architecture of the ROADM cluster node offers a number of benefits. The proposed architecture offers a roadmap of higher degree ROADM node architecture (e.g., 100 degree or more) that allow flexible add/drop rate up to 100%. The proposed architecture further offers a marketing story that communicates persuasively to customers that chassis purchased today may be re-used for scaling with no loss of investment; the scaling may be based only on software upgrades. The proposed architecture further offers a solution that maximizes re-usability of today's technology, i.e., use existing WSS 1×16 or 1×32 or the existing chassis. The proposed architecture further offers a low cost scalable architecture based on minimum set of existing Chassis with WSS 1×16 cards, or Chassis with WSS 1×32 cards, and existing Tributary cards in order to provide high degree ROADM with flexible add/drop. The proposed architecture further offers a non-blocking or low-blocking (at an acceptable blocking level of better than 1e-3) that requires no re-arrangement of existing connections.

It should be noted that the first and second proposed relationships, $1.15N \leq M \leq 1.5N$ and $M \leq 1.3N$ respectively, for a 3-stage network connectivity, as discussed herein, is not limited to wavelength cross-connect, but may also be used for digital layer as well. For instance, the proposed relationships of the ROADM cluster node may be applied to layer 0 (L0) to allow for scaling ROADM as discussed herein. Further, the proposed relationships may be applied to layer 1 (L1) for TDM/OTN switches/nodes for achieving: higher add/drop for existing customers where a pool of add/drop could be shared, and better connection grooming for OTN/TDM. Accordingly, the proposed architecture of the ROADM cluster node and the proposed relations between N and M may be used at photonic layer and at digital L1 layer.

As used herein, the term "about" should be read as including variation from the nominal value, for example, a +/−10% variation from the nominal value. It is to be understood that such a variation is always included in a given value provided herein, whether or not it is specifically referred to.

Embodiments of the present invention can be implemented using electronics hardware, software, or a combination thereof. In some embodiments, the invention is implemented by one or multiple computer processors executing program instructions stored in memory. In some embodiments, the invention is implemented partially or fully in hardware, for example using one or more field programmable gate arrays (FPGAs) or application specific integrated circuits (ASICs) to rapidly perform processing operations.

Figure 14:
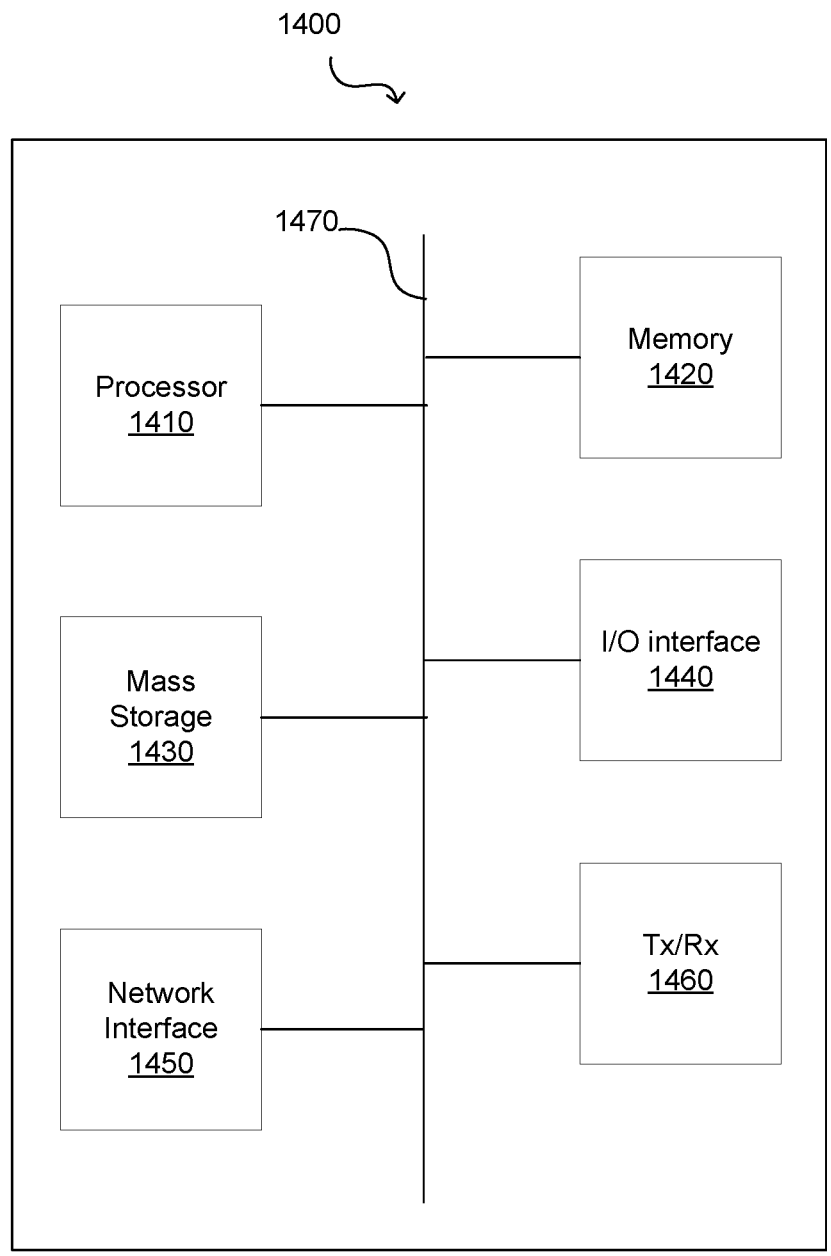
FIG. 14 is a schematic diagram of an electronic device that may perform any or all of operations of the above methods and features explicitly or implicitly described herein, according to different embodiments of the present invention.

FIG. 14 is a schematic diagram of an electronic device that may perform any or all of operations of the above methods and features explicitly or implicitly described herein, according to different embodiments of the present invention. For example, a computer equipped with network function may be configured as electronic device 1400.

As shown, the electronic device includes a processor 1410, such as a Central Processing Unit (CPU) or specialized processors such as a Graphics Processing Unit (GPU) or other such processor unit, memory 1420, non-transitory mass storage 1430, I/O interface 1440, network interface 1450, and a transceiver 1460, all of which are communicatively coupled via bi-directional bus 1470. According to certain embodiments, any or all of the depicted elements may be utilized, or only a subset of the elements. Further, the device 1400 may contain multiple instances of certain elements, such as multiple processors, memories, or transceivers. Also, elements of the hardware device may be directly coupled to other elements without the bi-directional bus. Additionally or alternatively to a processor and memory, other electronics, such as integrated circuits, may be employed for performing the required logical operations.

The memory 1420 may include any type of non-transitory memory such as static random access memory (SRAM), dynamic random access memory (DRAM), synchronous DRAM (SDRAM), read-only memory (ROM), any combination of such, or the like. The mass storage element 1430 may include any type of non-transitory storage device, such as a solid state drive, hard disk drive, a magnetic disk drive, an optical disk drive, USB drive, or any computer program product configured to store data and machine executable program code. According to certain embodiments, the memory 1420 or mass storage 1430 may have recorded thereon statements and instructions executable by the processor 1410 for performing any of the aforementioned method operations described above.

An aspect of the disclosure provides for a method of establishing a wavelength connection from a first direction to a second direction at a reconfigurable optical add-drop multiplexer (ROADM) cluster node. The method includes receiving the wavelength, from the first direction, at a first line chassis of the ROADM cluster node. The method further includes establishing a first wavelength connection, from the first line chassis to an interconnect chassis of the ROADM cluster node, wherein the first line chassis and the interconnect chassis are connected through a first optical fiber. The method further includes establishing a second wavelength connection, from the interconnect chassis to a second line chassis of the ROADM cluster node. In some embodiments, the second line chassis and the interconnect chassis are connected through a second optical fiber. In some embodiments, the second line chassis is associated with a second direction. In some embodiments, the establishing a first wavelength connection, from the first line chassis to an interconnect chassis of the ROADM cluster node includes establishing a wavelength connection, through an optical backplane of the first line chassis, from a line card of the first line chassis to an interconnect card of the first line chassis, wherein, the line card of the first line chassis is associated with the first direction and the interconnect card of the first line chassis is associated with the interconnect chassis. In some embodiments, the step of establishing a second wavelength connection, from the interconnect chassis to a second line chassis of the ROADM cluster node includes establishing a wavelength connection, through an optical backplane of the interconnect chassis, from a first interconnect card of the interconnect chassis to a second interconnect card of the interconnect chassis, wherein the first interconnect card of the interconnect chassis is associated with the first line chassis and the second interconnect card of the interconnect chassis is associated with the second line chassis. In some embodiments, the method further includes establishing a wavelength connection, through an optical backplane of the second line chassis, from an interconnect card of the second line chassis to a line card of the second line chassis, wherein the interconnect card of the second line chassis is associated with the interconnect chassis and the line card of the second line chassis is associated with the second direction. In some embodiments, the ROADM cluster node separates line functionality and add-drop functionality, and wherein the first line chassis and the second line chassis are part of a set of line chassis that performs the line functionality of the ROADM cluster node.

Another aspect of the disclosure provides for a method of dropping a wavelength at a reconfigurable optical add-drop multiplexer (ROADM) cluster node. The method includes receiving the wavelength at a line chassis of the ROADM cluster node. The method further includes establishing a first wavelength connection, from the line chassis to an interconnect chassis of the ROADM cluster node, wherein the line chassis and the interconnect chassis are connected through a first optical fiber. The method further includes establishing a second wavelength connection, from the interconnect chassis to an add-drop chassis of the ROADM cluster node for dropping, wherein the add-drop chassis and the interconnect chassis are connected through a second optical fiber. The method further includes dropping the wavelength at the add-drop chassis. In some embodiments, the establishing a first wavelength connection, from the line chassis to an interconnect chassis of the ROADM cluster node includes establishing a wavelength connection, through an optical backplane of the line chassis, from a line card of the line chassis to an interconnect card of the line chassis, wherein the interconnect card of the line chassis is associated with the interconnect chassis. In some embodiments, the establishing a second wavelength connection, from the interconnect chassis to an add-drop chassis of the ROADM cluster node for dropping includes establishing a wavelength connection, through an optical backplane of the interconnect chassis, from a first interconnect card of the interconnect chassis to a second interconnect card of the interconnect chassis, wherein the first interconnect card of the interconnect chassis is associated with the line chassis and the second interconnect card of the interconnect chassis is associated with the add-drop chassis. In some embodiments, the dropping the wavelength at the add-drop chassis includes establishing a wavelength connection, through an optical backplane of the add-drop chassis, from an interconnect card of the add-drop chassis to an add-drop card of the add-drop chassis, wherein the interconnect card of the add-drop chassis is associated with the interconnect chassis and the wavelength is dropped at the add-drop card of the add-drop chassis. In some embodiments, the ROADM cluster node separates line functionality and add-drop functionality, and wherein the line chassis is part of a set of line chassis that performs the line functionality of the ROADM cluster node, and the add-drop chassis is part of a set of add-drop chassis that performs the add-drop functionality of the ROADM cluster node.

Another aspect of the disclosure provides for a method of adding a wavelength associated with a direction at a reconfigurable optical add-drop multiplexer (ROADM) cluster node. The method includes receiving the wavelength at an add-drop chassis of the ROADM cluster node. The method further includes establishing a first wavelength connection, from the add-drop chassis to an interconnect chassis of the ROADM cluster node, wherein the add-drop chassis and the interconnect chassis are connected through a first optical fiber. The method further includes establishing a second wavelength connection, from the interconnect chassis to a line chassis of the ROADM cluster node, wherein the line chassis and the interconnect chassis are connected through a second optical fiber. The method further includes adding the wavelength to the associated direction at the line chassis. In some embodiments, the establishing a first wavelength connection, from the add-drop chassis to an interconnect chassis of the ROADM cluster node includes establishing a first wavelength connection, through an optical backplane of the add-drop chassis, from an add-drop card of the add-drop chassis to an interconnect card of the add-drop chassis, wherein the interconnect card of the add-drop chassis is associated with the interconnect chassis. In some embodiments, the establishing a second wavelength connection, from the interconnect chassis to a line chassis of the ROADM cluster node includes establishing a wavelength connection, through an optical backplane of the interconnect chassis, from a first interconnect card of the interconnect chassis to a second interconnect card of the interconnect chassis, wherein the first interconnect card of the interconnect chassis is associated with the add-drop chassis and the second interconnect card of the interconnect chassis is associated with the line chassis. In some embodiments, the adding the wavelength to the associated direction at the line chassis includes establishing a wavelength connection, through an optical backplane of the line chassis, from an interconnect card of the line chassis to a line card of the line chassis, wherein the interconnect card of the line chassis is associated with the interconnect chassis and the line card of the line chassis is associated with the direction to which the wavelength is to be added. In some embodiments, the ROADM cluster node separates line functionality and add-drop functionality, and wherein the line chassis is part of a set of line chassis that performs the line functionality of the ROADM cluster node, and the add-drop chassis is part of a set of add-drop chassis that performs the add-drop functionality of the ROADM cluster node.

It will be appreciated that, although specific embodiments of the technology have been described herein for purposes of illustration, various modifications may be made without departing from the scope of the technology. The specification and drawings are, accordingly, to be regarded simply as an illustration of the invention as defined by the appended claims, and are contemplated to cover any and all modifications, variations, combinations or equivalents that fall within the scope of the present invention. In particular, it is within the scope of the technology to provide a computer program product or program element, or a program storage or memory device such as a magnetic or optical wire, tape or disc, or the like, for storing signals readable by a machine, for controlling the operation of a computer according to the method of the technology and/or to structure some or all of its components in accordance with the system of the technology.

Acts associated with the method described herein can be implemented as coded instructions in a computer program product. In other words, the computer program product is a computer-readable medium upon which software code is recorded to execute the method when the computer program product is loaded into memory and executed on the microprocessor of the wireless communication device.

Further, each operation of the method may be executed on any computing device, such as a personal computer, server, PDA, or the like and pursuant to one or more, or a part of one or more, program elements, modules or objects generated from any programming language, such as C++, Java, or the like. In addition, each operation, or a file or object or the like implementing each said operation, may be executed by special purpose hardware or a circuit module designed for that purpose.

Through the descriptions of the preceding embodiments, the present invention may be implemented by using hardware only or by using software and a necessary universal hardware platform. Based on such understandings, the technical solution of the present invention may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided in the embodiments of the present invention. For example, such an execution may correspond to a simulation of the logical operations as described herein. The software product may additionally or alternatively include number of instructions that enable a computer device to execute operations for configuring or programming a digital logic apparatus in accordance with embodiments of the present invention.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

What is claimed is:

1. A reconfigurable optical add-drop multiplexer (ROADM) cluster node that separates line functionality and add-drop functionality, the ROADM cluster node comprising:
a set of g line chassis for performing line functionality, wherein each of the g line chassis comprises:
a set of N line cards; and
a set of M interconnect cards;
a set of h add-drop chassis for performing add-drop functionality; and
a set of M interconnect chassis configured for:
interconnecting each line chassis to each other line chassis; and
interconnecting each line chassis to each of the h add-drop chassis.

2. The ROADM cluster node of claim 1, wherein N<M.
3. The ROADM cluster node of claim 1, wherein $1.15N \leq M \leq 1.5N$.
4. The ROADM cluster node of claim 1, wherein $1.25N < M < 1.3N$.
5. The ROADM cluster node of claim 1, wherein each add-drop chassis comprises:
a set of X add-drop cards; and
a set of P interconnect cards, wherein P=M.
6. The ROADM cluster node of claim 1, wherein each of the M interconnect chassis comprises:
a set of g interconnect cards, wherein each of the g interconnect cards is connected to a different line chassis of the set of line chassis; and
a set of h interconnect cards, wherein each of the h interconnect cards is connected to a different add-drop chassis of the set of add-drop chassis.
7. The ROADM cluster node of claim 1, wherein each line chassis comprises T number of slots for housing the set of N line cards and the set of M interconnect cards such that N+M=T.
8. The ROADM cluster node of claim 6, wherein each interconnect chassis comprises S interconnect cards such that S=g+h and each of the g and h interconnect card comprises a wavelength select switch.
9. The ROADM cluster node of claim 1, wherein:
each of the N line card comprises a wavelength select switch.
10. The ROADM cluster node of claim, wherein X=N/2.
11. A chassis for performing one of line functionality and add-drop functionality of a reconfigurable optical add-drop multiplexer (ROADM) cluster node that separates line functionality and add-drop functionality, wherein the chassis comprises:
a set of M interconnect cards, wherein each of the M interconnect cards connects the chassis to each interconnect chassis of a set of M interconnect chassis of the ROADM cluster node.
12. The chassis of claim 11, wherein the chassis performs line functionality, the chassis further comprising a set of N line cards.
13. The chassis of claim 11, wherein the chassis performs add-drop functionality, the chassis further comprising a set of N/2 add-drop line cards.
14. The chassis of claim 12, wherein N<M.
15. The chassis of claim 12, wherein $1.15N \leq M \leq 1.5N$.
16. The chassis of claim 12 further comprising T number of slots for housing the set of N line cards and the set of M interconnect cards such that N+M=T.
17. An interconnect chassis for interconnecting each line chassis of a set of line chassis of a reconfigurable optical add-drop multiplexer (ROADM) cluster node to each add-drop chassis of a set of add-drop chassis of the ROADM cluster node, wherein:
the ROADM cluster node separates line and add-drop functionality;
the set of line chassis performs line functionality of the ROADM cluster node;
the set of add-drop chassis performs add-drop functionality of the ROADM cluster node; and
the interconnect chassis comprises:
a first set of interconnect cards, wherein at least one of the first set of interconnect cards is connected to a different line chassis of the set of line chassis; and a second set of interconnect cards, wherein at least one of the second set of interconnect cards is connected to a different add-drop chassis of the set of add-drop chassis.

18. The interconnect chassis of claim 17, wherein each line chassis of the set of line chassis comprises:
a set of N line cards; and
a set of M interconnect cards, wherein N<M.

19. The interconnect chassis of claim 17 wherein $1.15N \leq M \leq 1.5N$.

20. The interconnect chassis of claim 17 wherein each line chassis of the set of line chassis comprises T number of slots for housing the set of N line cards and the set of M interconnect cards such that N+M=T.

\* \* \* \* \*